(12) United States Patent
Manner

(10) Patent No.: US 12,529,618 B2
(45) Date of Patent: Jan. 20, 2026

(54) SEAL EVALUATION SYSTEMS AND METHODS FOR PERSONAL PROTECTION DEVICES

(71) Applicant: 3M INNOVATIVE PROPERTIES COMPANY, St. Paul, MN (US)

(72) Inventor: Marie D. Manner, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 108 days.

(21) Appl. No.: 18/578,552

(22) PCT Filed: Jul. 5, 2022

(86) PCT No.: PCT/IB2022/056222
§ 371 (c)(1),
(2) Date: Jan. 11, 2024

(87) PCT Pub. No.: WO2023/285919
PCT Pub. Date: Jan. 19, 2023

(65) Prior Publication Data
US 2024/0310230 A1 Sep. 19, 2024

Related U.S. Application Data

(60) Provisional application No. 63/203,306, filed on Jul. 16, 2021.

(51) Int. Cl.
*G01M 3/04* (2006.01)
*G01M 3/00* (2006.01)
*H04N 7/18* (2006.01)

(52) U.S. Cl.
CPC .............. *G01M 3/04* (2013.01); *G01M 3/002* (2013.01); *H04N 7/188* (2013.01)

(58) Field of Classification Search
CPC .......... G01M 3/04; G01M 3/002; G01M 3/38; G01M 3/20; H04N 7/188; G06V 20/52;
(Continued)

(56) References Cited

U.S. PATENT DOCUMENTS

| 8,636,956 | B2 | 1/2014 | Yamamori et al. |
| 2021/0052427 | A1* | 2/2021 | Awiszus ................. A62B 18/00 |

(Continued)

FOREIGN PATENT DOCUMENTS

| CN | 103705243 B | 11/2015 |
| WO | 2022235472 A1 | 11/2022 |
| WO | 2023285917 A1 | 1/2023 |

OTHER PUBLICATIONS

Dowdall, "Thermal image analysis for detecting facemask leakage", Proceedings of SPIE, Mar. 2005, vol. 5782, No. 1, pp. 46-53, XP055962707.

(Continued)

*Primary Examiner* — Jared Walker
(74) *Attorney, Agent, or Firm* — Katherine M. Scholz; Jonathan V. Sry

(57) ABSTRACT

A system for a PPE device is disclosed that includes an infrared camera that captures an image sequence of a user wearing the PPE device. The system also includes a gas profile generator that analyzes the image sequence and generates a gas profile of the PPE device. The system also includes an analyzer that determines a status of the PPE device based on the gas profile. The system also includes a communication component that communicates the status.

18 Claims, 17 Drawing Sheets

(58) Field of Classification Search
CPC .... G06V 40/171; A62B 9/006; A62B 23/025; A62B 27/00; A41D 13/1161
See application file for complete search history.

(56) References Cited

U.S. PATENT DOCUMENTS

2021/0142465 A1* 5/2021 Donoghue ............. G06V 20/20
2021/0322701 A1* 10/2021 Gugino ................. A61M 16/06
2022/0168535 A1* 6/2022 Lee .................... A61M 16/1065

OTHER PUBLICATIONS

International Search Report for PCT International Application No. PCT/IB2022/056222, mailed on Sep. 29, 2022, 4 pages.
Kerl, "Thermal Imaging of Mask Leakage During Pressure-Controlled Ventilation (Bipap Therapy)", Somnologie, Aug. 1, 2004, vol. 8, No. 3, pp. 83-86, XP002622214.
Roberge, "Infrared Imaging for Leak Detection of N95 Filtering Facepiece Respirators: A Pilot Study", American Journal of Industrial Medicine, 2011, vol. 54, No. 8, pp. 628-636, XP071569011.

* cited by examiner

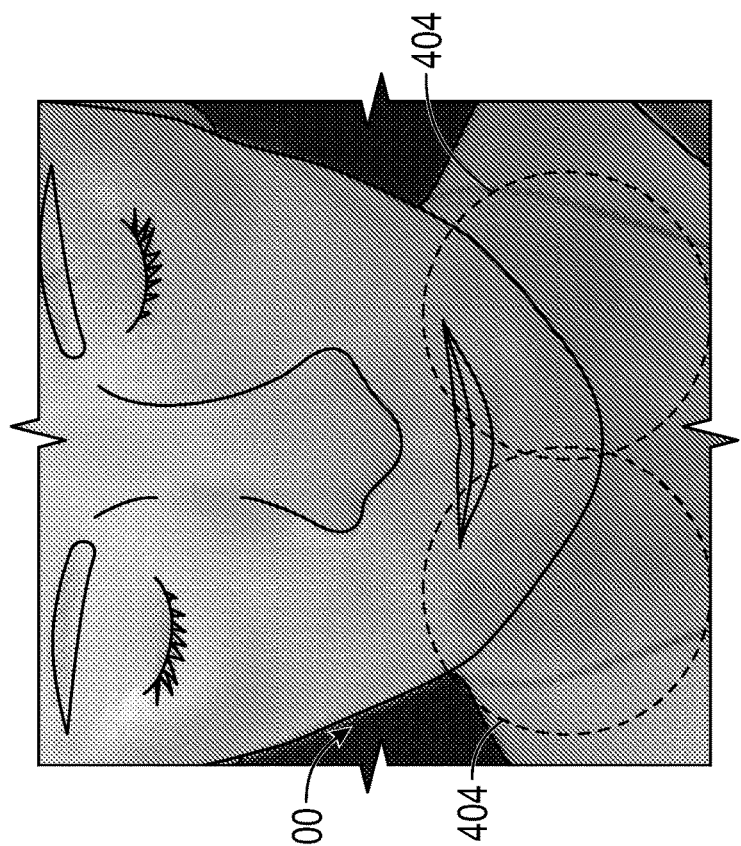
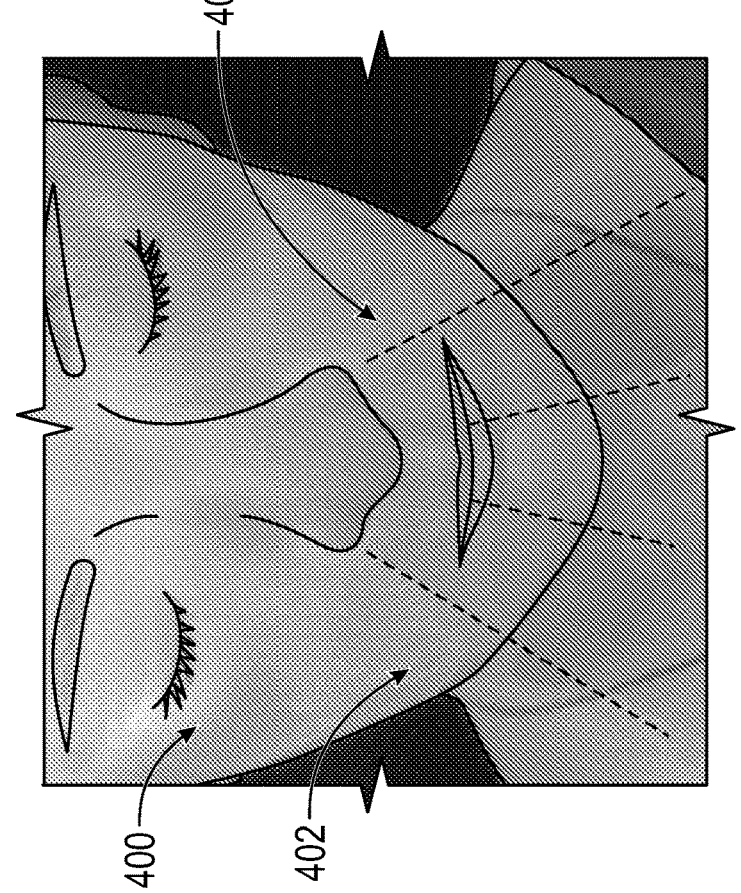
FIG. 4A
FIG. 4B

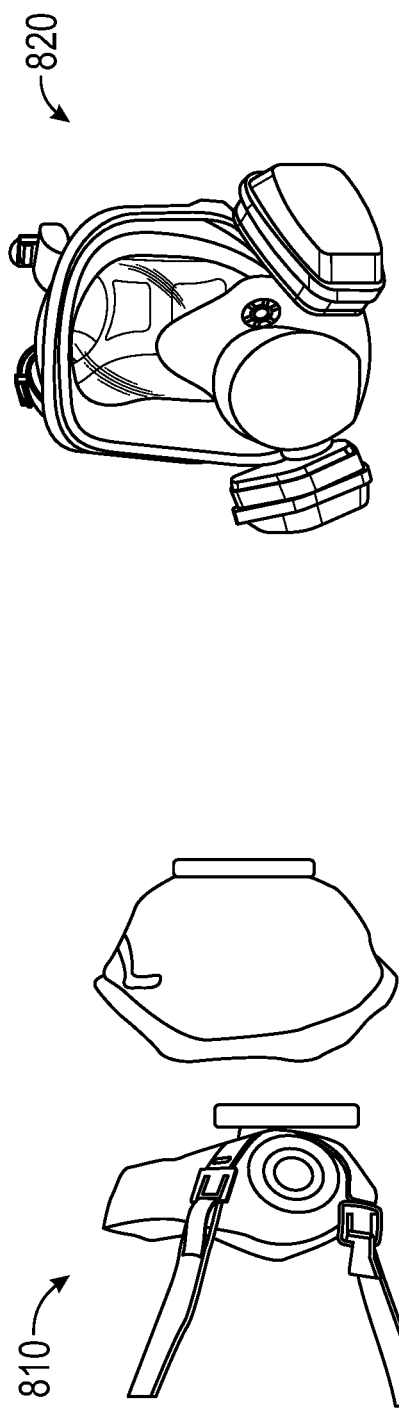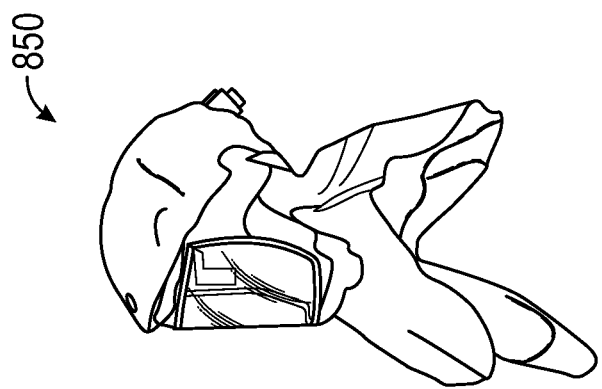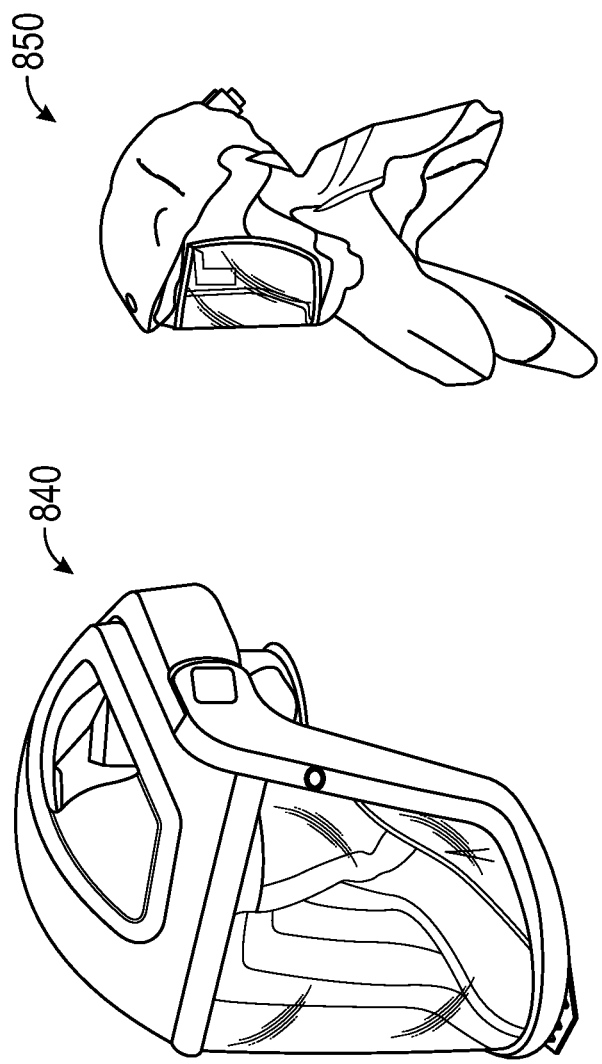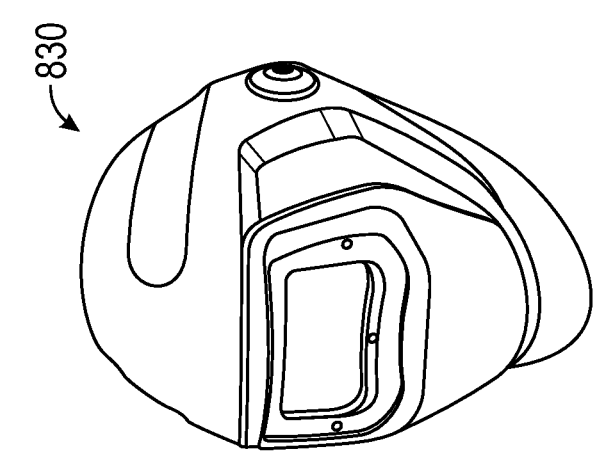
FIG. 8A
FIG. 8B
FIG. 8C
FIG. 8D
FIG. 8E

SEAL EVALUATION SYSTEMS AND METHODS FOR PERSONAL PROTECTION DEVICES

CROSS REFERENCE TO RELATED APPLICATIONS

This application is a national stage filing under 35 U.S.C. 371 of PCT/IB2022/056222, filed Jul. 5, 2022, which claims the benefit of U.S. Provisional Application No. 63/203,306, filed Jul. 16, 2021, the disclosure of which is incorporated by reference in its/their entirety herein.

BACKGROUND

Many PPE devices include seals that maintain a barrier between the wearer and the external environment, such as dust, mist, bacteria, etc., and are widely used in specific working environments and daily life. Respiratory protection devices and other face coverings are designed to provide a barrier to particulates and airborne or droplet-borne diseases, both by keeping exhalations from an infected individual contained and by providing a barrier from the coughs or exhalations of others. PPE have been required for healthcare and many industrial environments for years, and have seen increasing use as COVID-19 has required their usage in public places globally.

SUMMARY

An objective of the present invention is to provide systems and methods for checking the quality of seals and general fitness of PPE worn by an individual in an environment. In-situ seal checks, without significant disruption to the individual, can more accurately detect issues and provide feedback to the individual, which can better protect them from particulates, gas, microbes or other risks. Using infrared imaging to detect $CO_2$ flow patterns provides a quick way to evaluate PPE seals, determine locations of potential cracks or leaks, and provide feedback without significant disruption to the wearer of the PPE. Frequent seal checks, and rapid feedback, may increase safety of the wearer.

A system for a PPE device is disclosed that includes an infrared camera that captures an image sequence of a user wearing the PPE device. The system also includes a gas profile generator that analyzes the image sequence and generates a gas profile of the PPE device. The system also includes an analyzer that determines a status of the PPE device based on the gas profile. The system also includes a communication component that communicates the status.

BRIEF DESCRIPTION OF THE DRAWINGS

The embodiments of the present invention are described below merely as examples with reference to the accompanying drawings. In the accompanying drawings, the same features or components are represented by the same reference numerals, and the accompanying drawings are not necessarily drawn to scale. Further, in the accompanying drawings:

FIGS. 4A-4F are IR images of an individual exhaling and illustrate carbon dioxide flows.

FIGS. 8A-8E illustrates PPE that may be evaluated using systems and methods herein.

DETAILED DESCRIPTION

Figure 1:
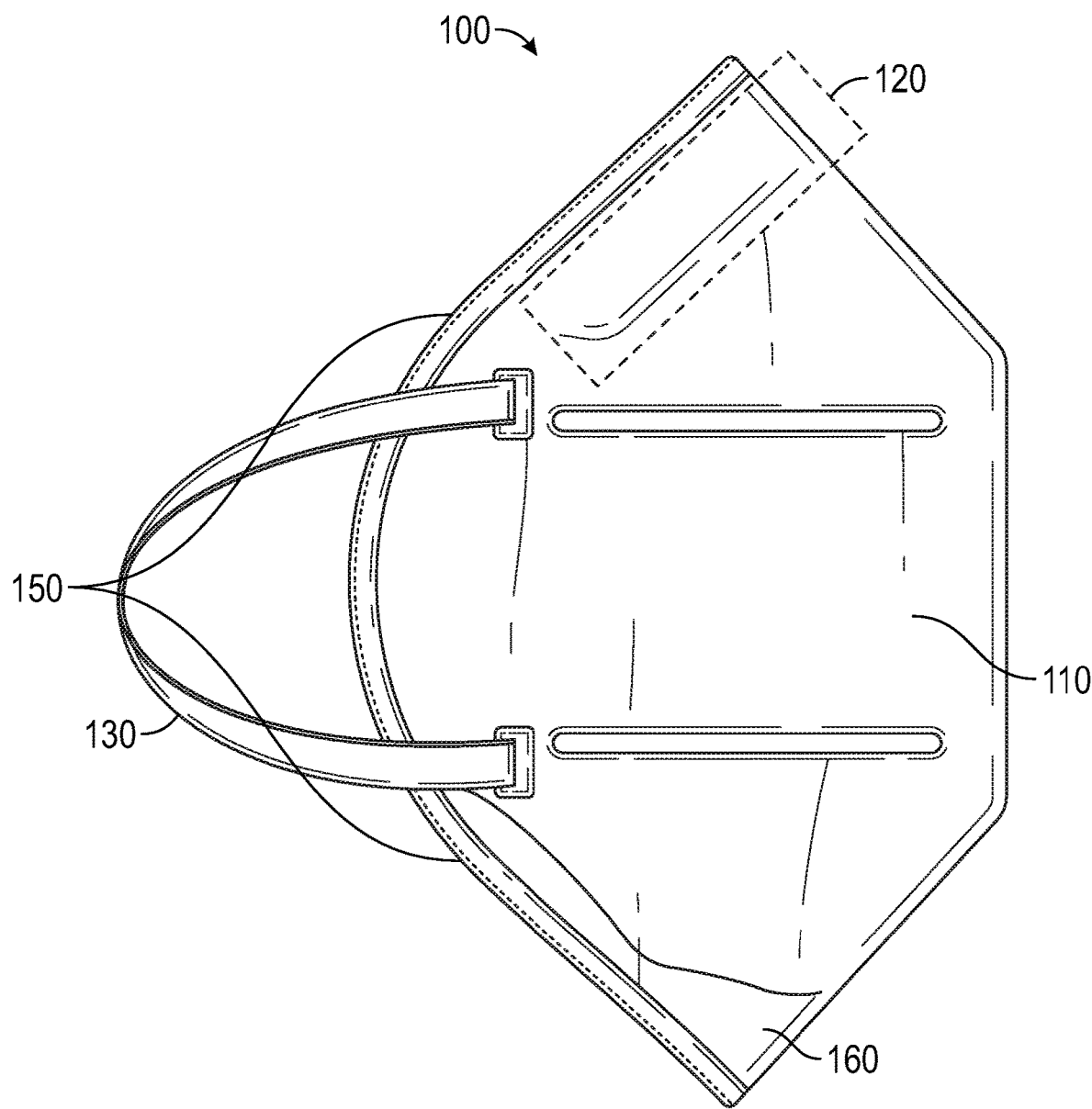
FIG. 1 is a view of a respirator.

The following descriptions are substantially merely exemplary, and are not intended to limit the present invention, the application, and the use. It should be understood that in all of the accompanying drawings, similar reference numerals represent the same or similar parts and features. The accompanying drawings illustratively show the idea and principles of the embodiments of the present invention, but do not necessarily show specific size of each embodiment of the present invention and the scale thereof. In some parts of specific accompanying drawings, related details or structures of the embodiments of the present invention may be illustrated in an exaggerated manner.

The use of personal protective equipment (PPE) has become an important part of the strategy to limit the spread of respiratory infections. Respiratory protection devices (RPDs), in particular, have become increasingly important globally as COVID-19 has spread. Two types of respiratory protection devices are in increasingly common use: filtering facepiece respirators (FFRs, referred to as "respirators" herein) and face masks (commonly called masks, often made of cloth). As used herein the term "respiratory protection devices" may refer to respirators, face masks, or other facial coverings.

The term "face mask" generally refers to a face covering that inhibits droplets from the wearer from spreading, e.g. from a cough or a sneeze. However, face masks often provide little or no protection against droplets from another individual. FFRs, in contrast, are designed to seal to a user's face, such that inhaled air is forced through one or more filter layers, such that most droplets, microbes, and particulates are removed from inhaled air before it reaches a wearer. Additionally, some FFRs include charged fibers that attract microbes or particulates, providing increased protection.

Filtering facepiece respirators (FFRs) are sometimes referred to as disposable respirators (DRs). When worn properly, FFRs are designed to protect the wearer by removing harmful particles from inhaled air. FFRs are regulated by the National Institute for Occupational Safety and Health (NIOSH). To provide the required level of protection, an FFR must seal to the wearer's face, preventing gaps between the respirator and the wearer's skin since such gaps can allow contaminated air to leak into the breathing zone of the wearer. Therefore, tight fit of the FFR to the face of the wearer is essential.

Respiratory protection devices are mass produced with the goal of fitting many different facial structures, including male and female, high or low cheekbones, prominent jaws, etc. Additionally, respiratory protection devices are often worn during activity, such that the wearer may have different facial expressions during use, may walk or run, may sweat or laugh. Additionally, different types and different models of respiratory protection devices may be worn at different facial positions for the same user, depending on usage or activity.

Ideally, when worn, a respiratory protection device should fit the contour of the face of a wearer to form good sealing between the respirator and the face of the wearer. However, the contour of the face of the wearer is not the same between individuals, and there can be large differences from individual to individual. The contour of the nose is complex and fluctuates: it is often difficult to form a good seal, and a gap is often present between the respiratory protection device and the nose area of the wearer, resulting in a poor sealing effect. As a result, dust, mist or bacteria, virus, fungi in an environment where the wearer is located will be in contact with the wearer through the gap and is inhaled by the wearer, thus affecting the protective effect of the respirator. Additionally, the exhaled breath of the wearer will also be discharged upwards through this gap. For the case where the wearer wears glasses, if the temperature in the respirator is higher than the ambient temperature, the exhaled breath will cause fogging and affect the wearing experience of the wearer.

Therefore, in order to improve the protective effect of a respiratory protection device and improve the wearing experience, it is expected that the respiratory protection device can fit the contour of the face of the wearer and achieve good sealing between the respiratory protection device and the face of the wearer. In some RPDs, a metal or plastic nose strip with a memory effect is used to hold the RPD against a face of an individual. However, other sealing or seal-improving options may be used, including a shaped nose foam as described in U.S. Provisional Patent Application with Ser. No. 63/201,604, filed on May 6, 2021.

The RPD should stay in place on an individual's face during any time the user is exposed to potentially harmful particulates or microbes. Many users of RPDs do not remain stationary during a workday, but move around, speak, walk, run, etc. For example, in an industrial setting a user may wear a respiratory protection device for one, two, four or even 8 hours while a clinician in a hospital may wear a respiratory protection device for an entire shift (8 hrs) or perhaps even a double shift (16 hrs). It is conceivable, potentially even likely, that an RPD may move during this time, potentially causing a good seal to become a bad seal. Detecting when an individual's RPD no longer adequately seals to their face, and is no longer providing sufficient protection, increases safety in a workplace. It is important that systems and methods for checking a system be simple to use or interact with, provide quick feedback, and be touch-free, so that an individual does not lose significant amounts of time during a shift. Additionally, it is desired that systems and methods not rely on a component built into the RPD, as it is desired to keep costs of individual RPDs low.

Described herein are systems and methods that may be useful for environments in which users wear respiratory protection devices generally. Systems and methods herein may be useful for in-situ seal checks for individuals wearing RPDs.

However, while systems and methods are described herein for RPDs, and respirators in particular, this is for example only and it is expressly contemplated that embodiments herein may apply to other PPE, as discussed particularly with respect to FIG. 7.

FIG. 1 is a view of a respirator. Respirator 100 is an earloop respirator. In the example shown in the drawing, respirator 100 is a foldable earloop respirator. However, the present invention is not limited thereto, and may also be applied to non-foldable or non-earloop respirators as well as to other RPDs more broadly. In the manufacturing process of the first respirator 100, a formable nose piece (often metal, however other suitable materials are envisioned) is attached to an inner or outer side of a respirator main body 110, within area 120. When the first respirator 100 is worn, a lanyard 130 is hung on the left and right ears of the wearer, respectively.

It is intended that a user adjust respirator 100 so that the nose of the wearer is accommodated in by adjusting the formable nose piece such that area 120, and the exterior edge 150 conform to the contour of the face of the wearer to closely fit the periphery of the nose of the wearer, thus reducing or even eliminating the gap between the respirator and the nose of the wearer. A good seal between respirator 100 and the face of the wearer is important for safety concerns.

Earloops 130, or another tension device such as a headband, pull RPD 100 toward the face of a user, causing a seal to form on a face contacting portion of the RPD. A seal may not necessarily form along edges 150. For example, a seal may form along line 160, where a user's chin seals the RPD along a jawline.

Figure 2B:
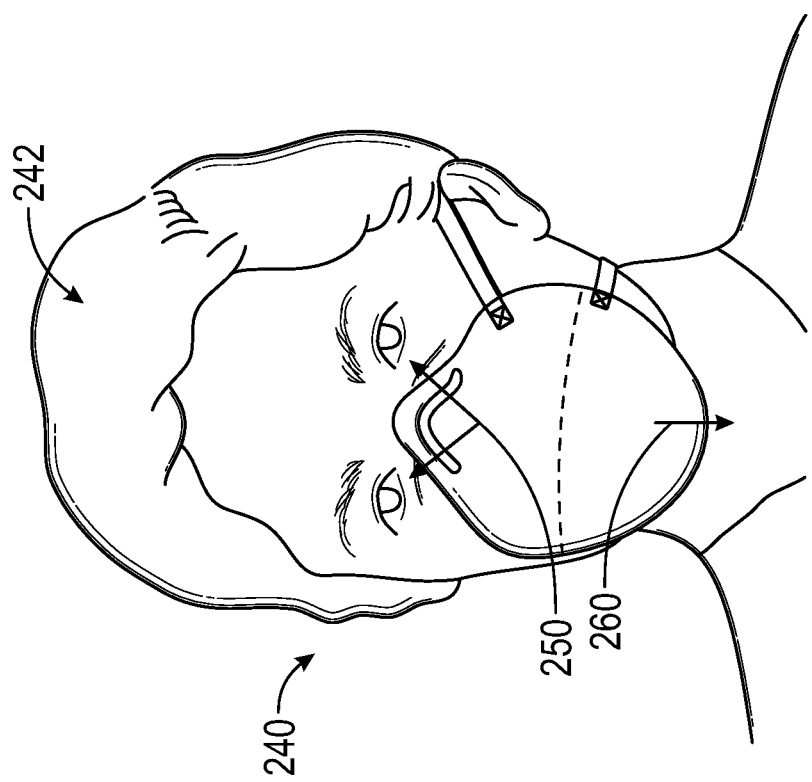
FIGS. 2A and 2B illustrate respiratory protection devices (RPDs) worn by users in which embodiments of the present invention may be useful.
Figure 2A:
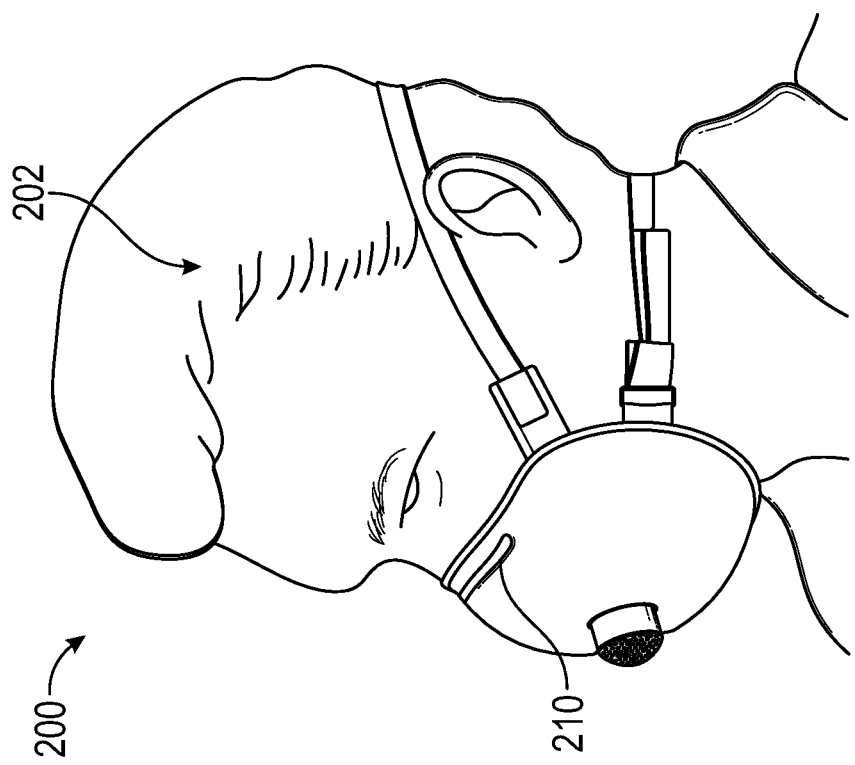

FIGS. 2A and 2B illustrate a respiratory protection device worn by a user in which embodiments of the present invention may be useful. As illustrated in FIGS. 2A and 2B, respiratory protection devices 200 and 240 can be secured over a user's face using a variety of methods other than the lanyard illustrated in FIG. 1.

Respiratory protection devices 200 and 240 are intended to form a seal along the edges of the RPD, where the face-contacting side contacts the face. If an imperfect seal is present, then exhaled air may be forced upward, out of the nose portion as indicated by arrows 250, and/or downward, out through the chin portion, as indicated by arrow 260, causing discomfort for some users, and may also cause respiratory protection devices 200, 240 to move up or down along a nose of user 202. A user can adjust a nose clip 210 to improve the fit of respiratory protection devices 200, 240. It may also be necessary, if a particular RPD 200, 240 does not fit well, to move up or down in size, or to switch to a different model of RPD.

All objects emit infrared radiation as a function of temperature. The emitted thermal energy can be seen using an infrared (IR) camera. IR waves may be captured in any of four bands—near-IR around 0.75 μm, middle IR around 3-6 μm, far IR around 6-15 μm, or extreme IR around 15-100 μm Additionally, using an IR camera with a $CO_2$ filter, the exhalation flow patterns of a user's breath can be seen and analyzed. Carbon dioxide visible is around 15 and 4.3 μm. While simply using infrared to detect the heat of a disposable respirator wearer is possible, the heat escaping through the filter media, and the amount of heat retained in the filter media may significantly vary from wearer to wearer, may vary when a user is breathing heavily versus normally, and may vary by filter media.

Using an IR camera with a $CO_2$ filter, it is possible to capture the path of escape of the wearer's exhaled breath, which contains carbon dioxide, and which, under good seal conditions, must flow through the filter media and not escape through seals along the wearer's face. In contrast, a seal with leaks should allow more $CO_2$ to escape through a leak, compared to an over-all exit from the filter media.

As described herein, in some embodiments a computer vision system captures video imagery from an appropriate infrared camera configured with a $CO_2$ filter. Based on the captured images, a trained model can analyze the $CO_2$ flow patterns and determine whether a seal between a PPE and a wearer's face is adequate.

In some embodiments, a PPE evaluation system is trained on different classes of PPE, for example well-fitting valved respirators, ill-fitting valved respirators, well-fitting non-valved respirators, ill-fitting non-valved respirators, etc. The PPE evaluation system will then determine, based on an identification of the PPE, whether a seal is adequate. The determination may be done, for example, by looking at total $CO_2$ concentrations detected around the seal of the respirator. Higher concentrations in only some locations mean an ill fit, such as concentrations visible near nose-clip means an ill fit around the nose. The determination may also be done, for example, by looking at total $CO_2$ movement around the DR and $CO_2$ flow patterns. For example, when using an ill-fitting respirator, the breath (containing $CO_2$) flows first and fastest through big leaks in the respirator seal. A properly fitted respirator will show no faster $CO_2$ movement and no $CO_2$ visible around the respirator seal: instead it will come through the filter media. When considering larger PPE devices, such as a full facepiece respirator, the $CO_2$ should be visible near the filters at the beginning of an exhalation but should not be visible around the seal initially, only after the breath floats up and creates a cloud around the facepiece.

Currently, gas measurements can be taken by sensors positioned on the interior of the face mask, or by enclosing the wearer entirely in a hood or contraption to put particulate or gas in the area around the user to test the goodness of fit. However, this requires sensors be placed within a PPE and be functioning properly, or requires the user to stop a current activity to undergo fit testing. Instead, it is desired to have a system or method that can evaluate PPE functionality based on video imagery captured while a user is completing a current task. This can both give an accurate in-situ understanding of PPE functionality for the user during a given task, and also does not interrupt a user from completing said task.

For example, considering RPDs, it is important that users 202, 242 have a good seal present at all times when in a work environment where an RPD is required. Seal check sensors have been added to RPDs in the past to allow a user to obtain an instantaneous check of an RPD seal. However, this requires a user 202, 242 to have purchased an RPD with such a sensor, which will have an increased cost compared to an RPD without a sensor. Additionally, at least some sensors require the user to activate, or touch to initiate a seal check. This is not desirable as it requires a user to interrupt their activity and touch their mask (which may be particularly undesirable in a healthcare setting), which may also cause the mask position to change.

Additionally, sensors are currently not available for filtering facepiece respirators, but only for elastomeric or rubber face pieces. It is desired to be able to monitor a variety of RPDs.

In industries where tight-fitting facepieces, such as RPDs are required, fit testing is the responsibility of the employer, and may be done annually or more frequently. Fit testing is done to ensure that an individual has an RPD that provides a good seal with a tight-fitting mask. Because face structures can vary widely between individuals, fit testing should happen during the initial selection of an RPD, before it is worn in a hazardous environment.

Users are responsible for conducting fit checks every time an RPD is used. A user must understand how to conduct a fit check each time an RPD is put on, and be trained in the technique for fit checking each model of RPD they use. Negative and positive pressure techniques may be used to judge the quality of the fit. However, individuals are not perfect and it is possible for a user to forget to fit check an RPD, forget how to fit check an RPD, or conduct the fit check incorrectly. Even when done correctly, judging the quality of a fit does not necessarily result in a numeric value that clearly provides an indication that a fit is good or poor.

Figure 3:
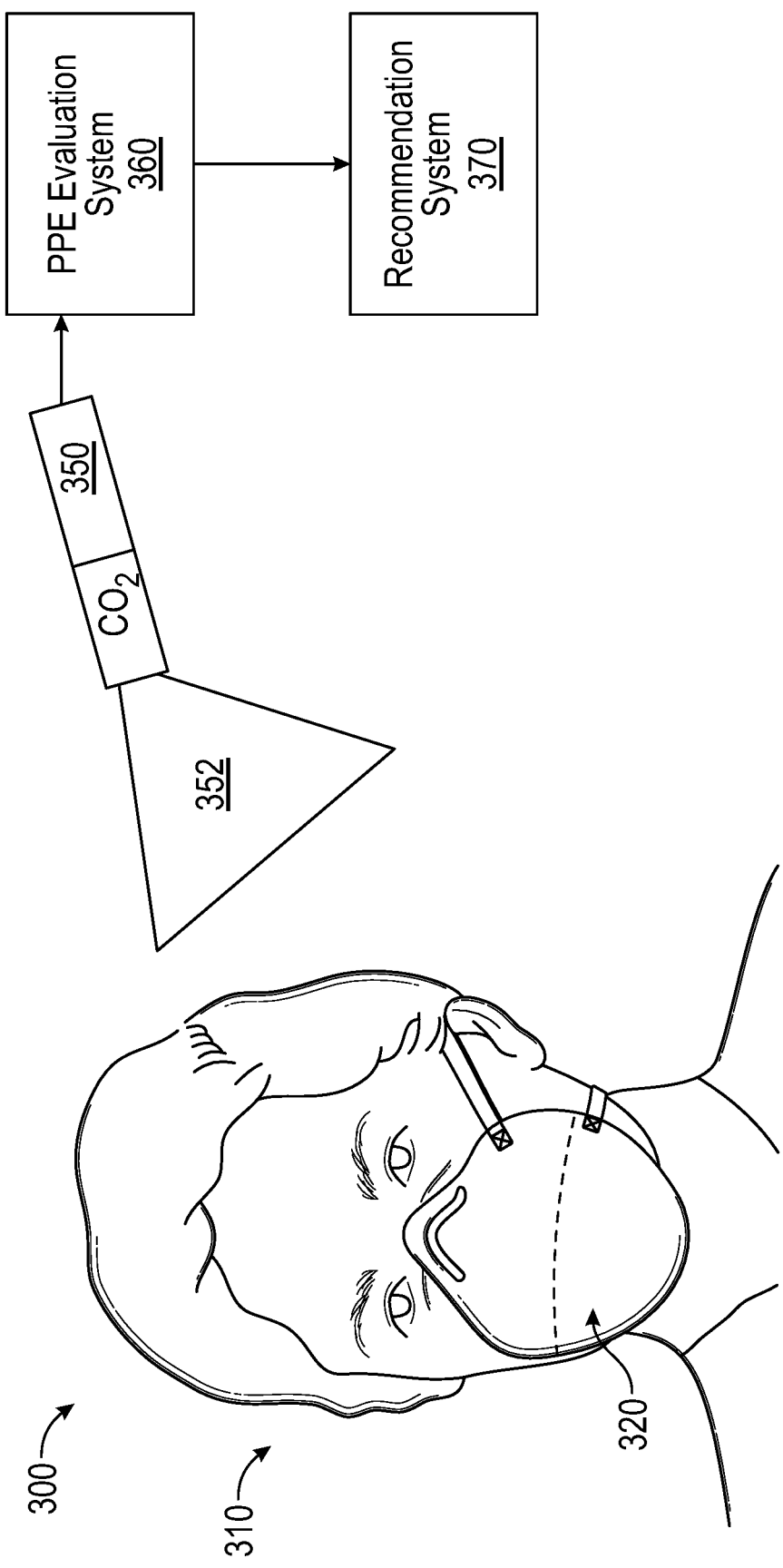
FIG. 3 illustrates a schematic of a system for checking an RPD seal on an individual in an environment in accordance with embodiments herein.

FIG. 3 illustrates a schematic of a system for checking an RPD seal on an individual in an environment in accordance with embodiments herein. A PPE evaluation system 360 is located in an environment 300. A user 310 is in environment 300 and is wearing an RPD. Environment 300 may be a healthcare environment, an industrial environment, or any other environment where RPDs 320 are required PPE for individuals 310.

As discussed in greater detail herein, an environment 300 may include one or more IR imaging cameras with a $CO_2$ filter 350, each with a field of view 352. In some embodiments, camera 350 may be a mounted camera, for example a security camera mounted in a corner or on a wall. In some embodiments, camera 350 may be a semi-mobile camera, for example in a fixed position with a pan and tilt assembly. In some embodiments, camera 350 is a mobile camera, for example mounted on another user or mounted on a mobile robot capable of moving about environment 300. It is also expressly envisioned that environment 300 may have multiple cameras, each positioned with differing fields of view 352. However, for ease of understanding, only one camera 350 is illustrated in FIG. 3.

IR camera with a $CO_2$ filter 350 has a field of view 352 that captures an image, series of images, or video of user 310 when user 310 enters field of view 352. It is described herein that, in some embodiments, a video is captured and analyzed. However, it is expressly contemplated that the analysis may be done with images representing different times during a breathing sequence. For example, if an image processor or analyzer is located remotely from camera 350, it may be desired to send smaller image data files than a full video file, for increased speed of results. For example, the first images after a wearer breathes out should show a leak because there will be a further puff of gas from the respirator than is evident almost immediately after exhalation starts. A system may instruct the wearer to breathe in, for example, to clear the gasses around their face, and then, when prompted, exhale. The system may then take a few frames from that initial exhale. Additionally, in some embodiments, it is envisioned that the system is a trained neural network that classifies single frames taken during an exhalation as 'leak' or 'no leak'.

PPE evaluation system 360 receives images of user 310 and, based on the images, determines whether or not a fit is satisfactory. For example, an FFR with a good seal will force all exhaled air to flow through the filter, which can be seen in the images. An FFR with a poor seal will see air forced through a leak, as that is the path of least resistance for the exhaled air.

PPE evaluation system 360 may output a numerical evaluation of a seal for an RPD 320 to a recommendation system 370. The seal evaluation may be an indication of whether the seal is adequate or not, an indication of whether (or where) a leak is detected, or may include instructions for improving a seal or improving functionality of a PPE, such as replacing a filter that is experiencing high loading. For RPDs, recommendation system 370 may indicate to individual 310 that RPD 320 is adequately sealed, or not adequately sealed. If RPD 320 is not adequately sealed, then system 370 may provide some recommendations to increase the safety of individual 310, for example by repositioning RPD 320, adjusting a nosepiece of RPD 320, or by recommending a user change out RPD 320 for a different size or model.

Camera 350 may be any suitable IR camera that captures images in any IR spectra bands in which $CO_2$ can be detected. Camera 350 may capture a video stream, or images. Camera 350 may only capture images, or send captured images to PPE evaluation system 360, based on detection of individual 310 in field of view 352. Camera 350 may also, in some embodiments, capture a video stream but only send relevant images, or relevant image sequences, such as images during the beginning of an exhalation sequence. Additionally, it may be possible to detect a leak based on inhalation sequences, as the $CO_2$ from a previous exhalation may return into a mask through a leak, and may be detected.

Figure 4D:
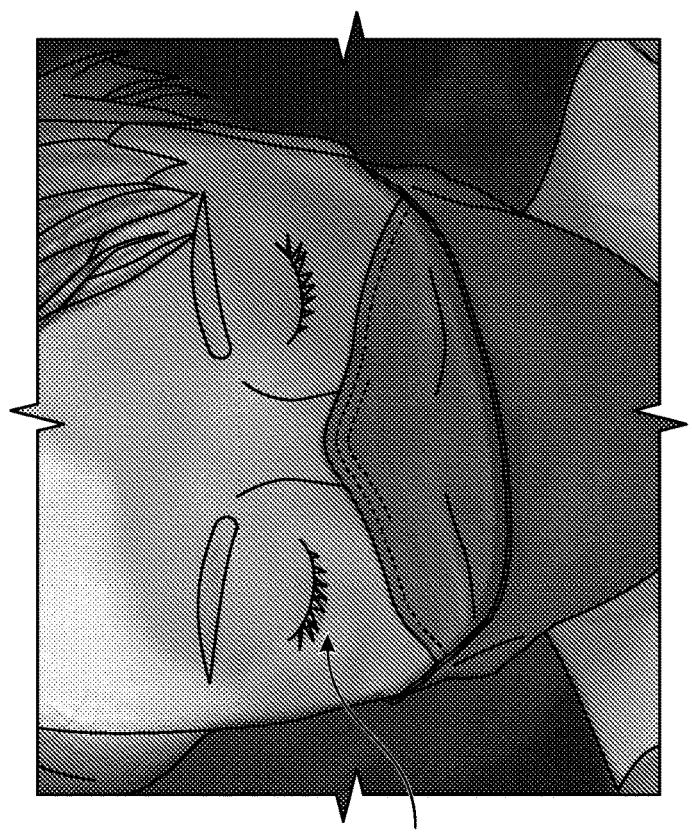
Figure 4C:
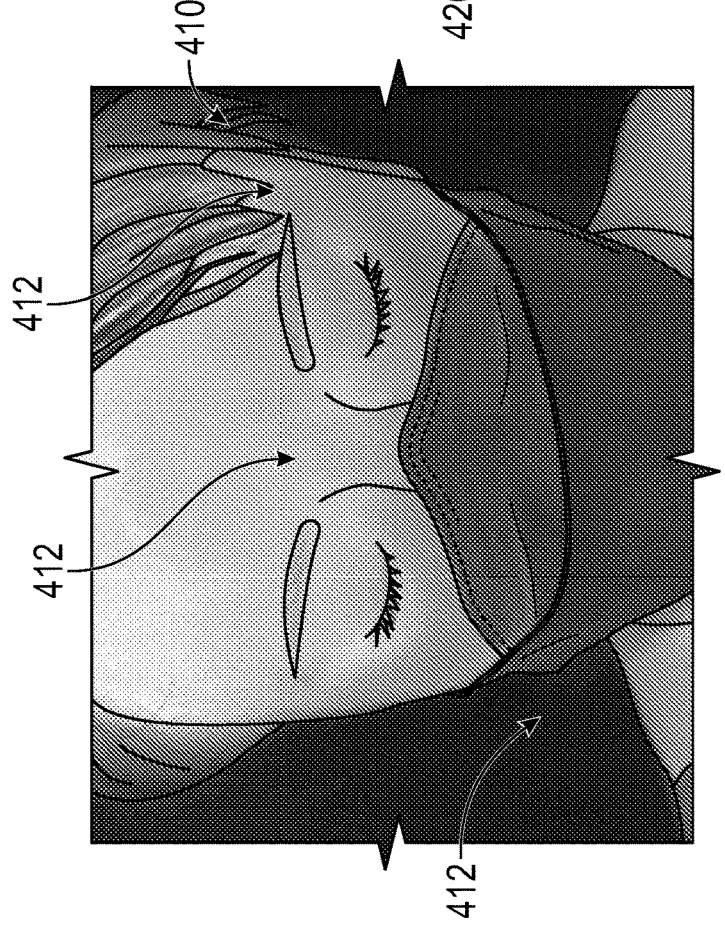
Figure 4E:
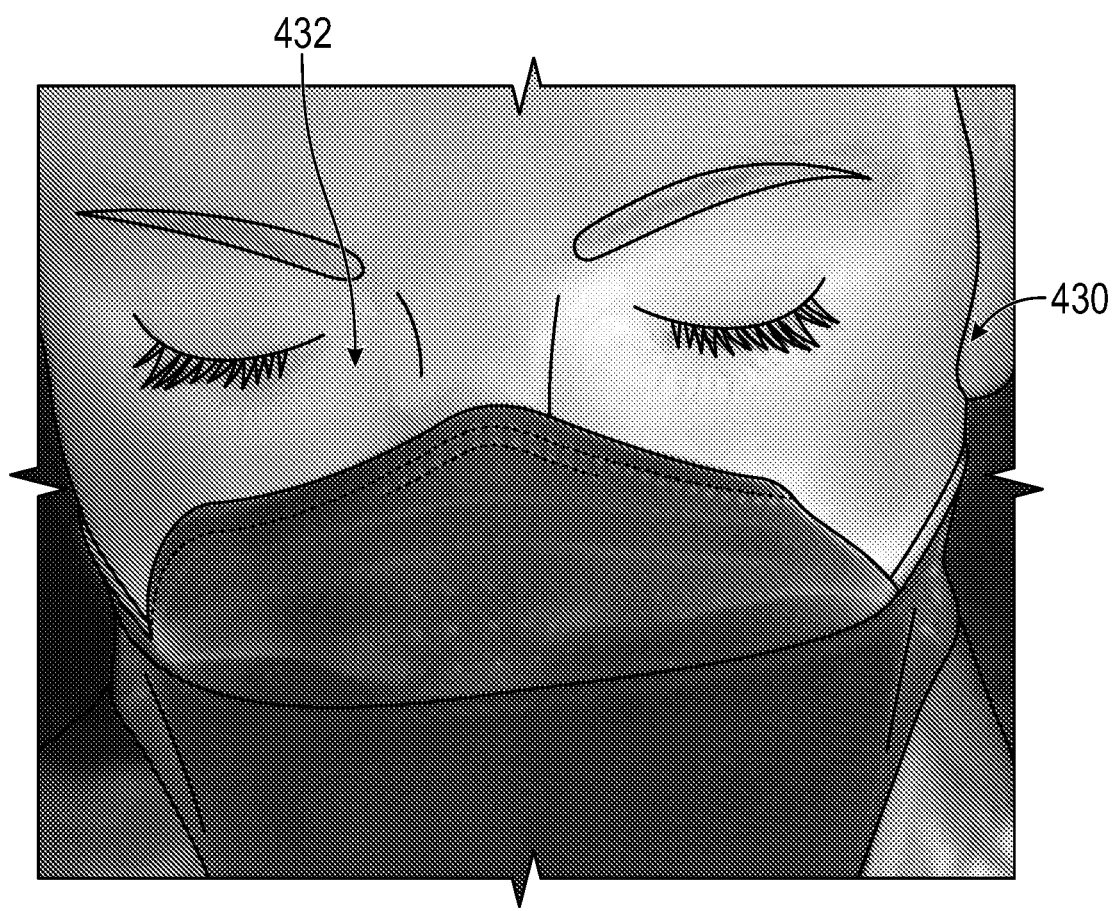
Figures 1, 4F:
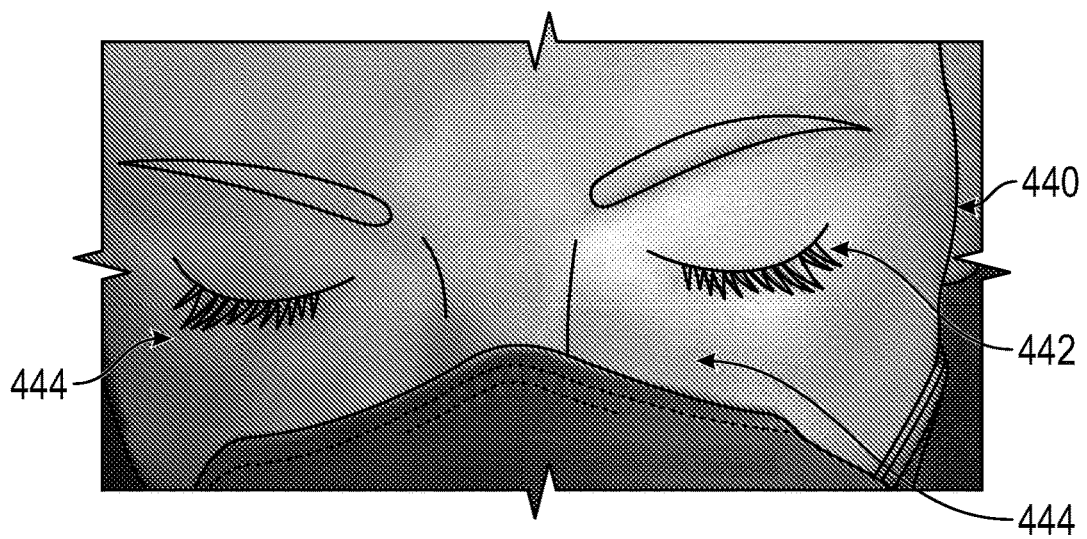
Figures 2, 4F:
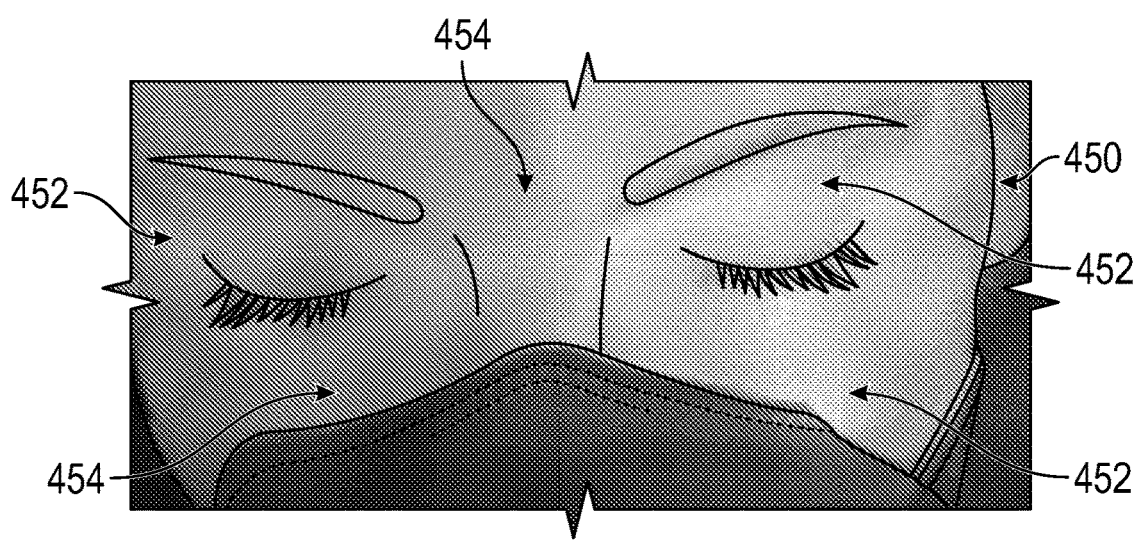
Figures 3, 4F:
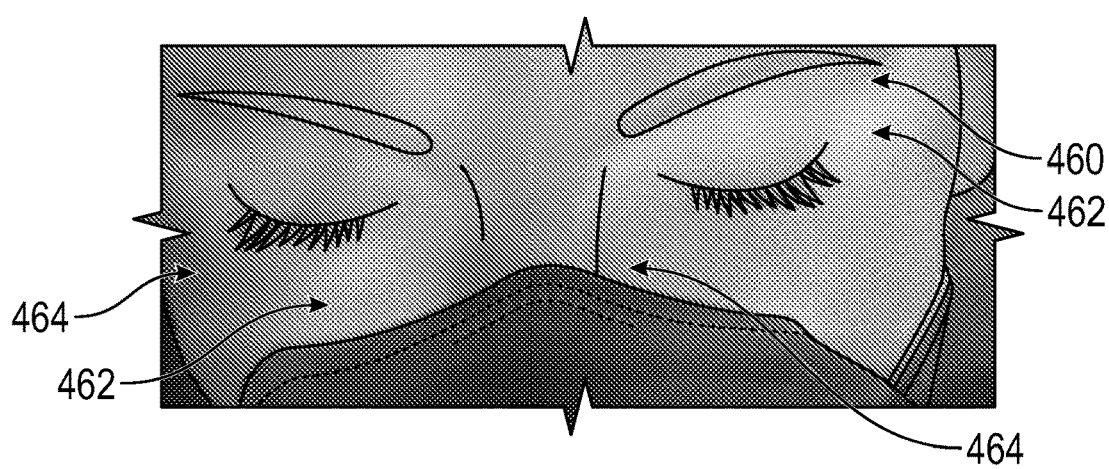

FIGS. 4A-4F are IR images of an individual exhaling and illustrate carbon dioxide flows. FIGS. 4A and 4B illustrate an individual exhaling without an RPD to illustrate how the $CO_2$ flows are captured using an IR camera with $CO_2$ filter. FIGS. 4C and 4D illustrate a user wearing an RPD with a good fit at the beginning (FIG. 4C) and at the end (FIG. 4D) of an exhale. FIG. 4E illustrates an image of a user exhaling with a poor fitting mask. FIGS. 4F-1 to 4F-3 illustrate images in sequence of a user exhaling with a poor fitting mask.

FIGS. 4A and 4B illustrate an individual 400 exhaling. In FIG. 4A, the exhale is clearly visible blowing in the directions 402, while in FIG. 4B the exhale is visible as plumes 404. As illustrated in the images of FIGS. 4A and 4B, the exhale is visible because of the increased concentration of $CO_2$. Depending on the force behind the exhale, the plumes may be directed further away, as illustrated in FIG. 4A, or may start to disperse more closely to a user's face, as illustrated in FIG. 4B.

FIG. 4C illustrates a user 410 starting to exhale through an FFR with a good seal. Plumes of $CO_2$ 412 are visible, being forced through the FFR. As illustrated in FIG. 4D, a user 420 is ending an exhale, and $CO_2$ plumes have caused a shadow to appear over the image as the $CO_2$ is forced out through the FFR evenly.

In contrast, FIG. 4E illustrates $CO_2$ being forced through a leaky seal 432 of an FFR worn by a user 430. The leak is likely caused by a nose clip being incorrectly applied, leaving a gap between the nose and the FFR edge.

FIGS. 4F-1, 4F-2 and 4F-3 illustrate frames of a video of a user exhaling through a leaky RPD. It is noted that the positions of light portions 442, 452, and 462 and positions of dark portions 444, 454, 464 change between images 440, 450 and 460 respectively as the user exhales. This is due to the exhaled air being forced through a leaky area around the nose clip.

Systems and methods herein capture IR images with an IR camera and $CO_2$ filter and, analyzing $CO_2$ exhalation patterns associated with known PPE operating adequately or malfunctioning, analyze the PPE, both checking for leaks and functionality. In some embodiments, background subtraction and image classification is done after image smoothing and aligning. Particle image velocimetry may also be used as an analysis tool. Deep learning algorithms, including neural nets, may also be used, in some embodiments.

Figure 5:
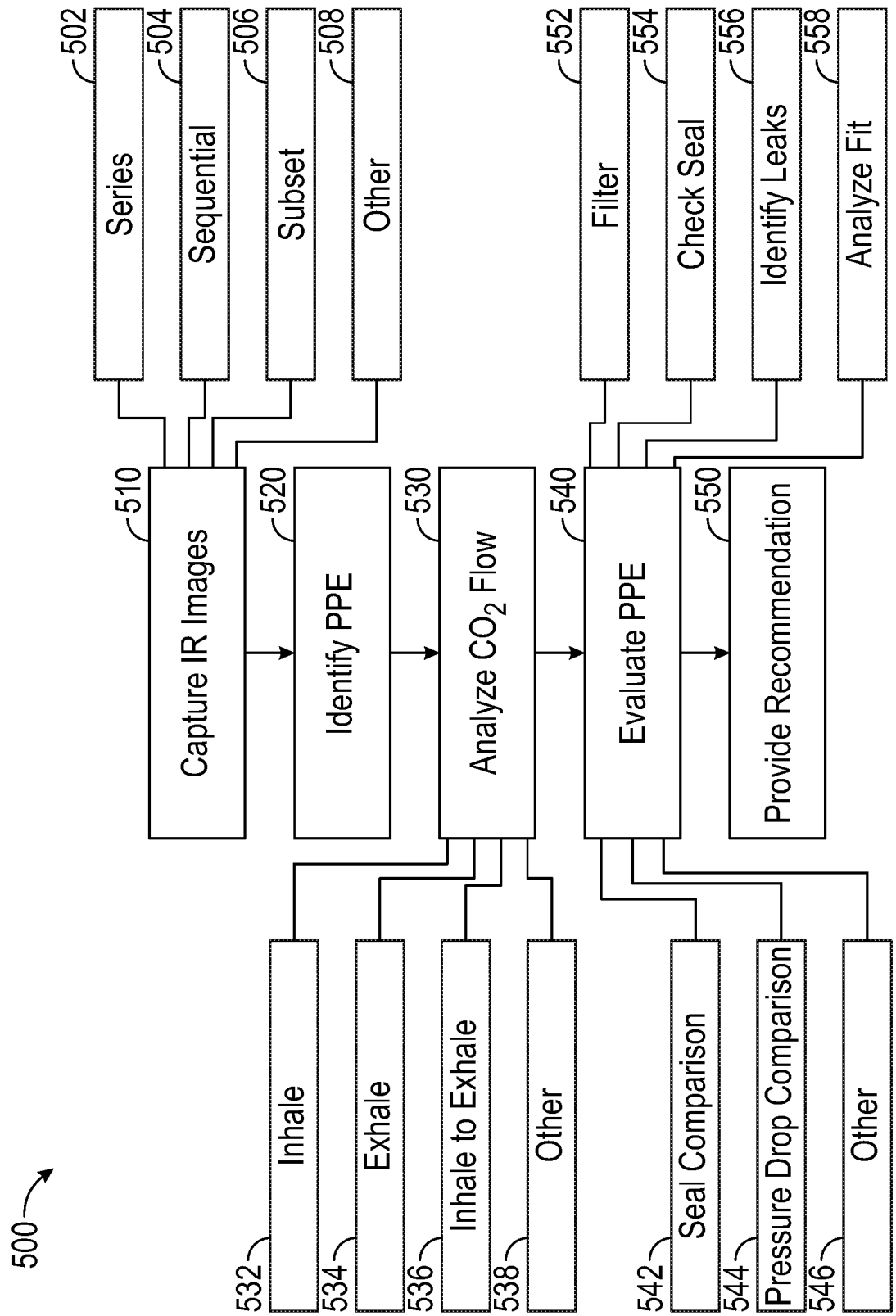
FIG. 5 illustrates a method of evaluating PPE by monitoring $CO_2$ flows in accordance with embodiments herein.

FIG. 5 illustrates a method of evaluating PPE in accordance with embodiments herein. Method 500 may be implemented in an environment where individuals require PPE protection. The environment may have one or more mounted, stationary, mobile or roving camera systems capable of taking IR photographs with a $CO_2$ filter. In some embodiments, the camera is worn by or built into equipment worn by another individual in the environment. Method 500 may proceed automatically, in some embodiments, when a person wearing PPE is detected within a field of view of a camera, which may be done using any known or future developed techniques. Detecting a person may involve detecting movement within a field of vision of a camera and identifying it as a human. Detecting a person may also include identifying the person, for example as a nurse vs a doctor, or as a particular individual, such as Nurse John Doe. In some embodiments, different PPE requirements may be necessary based on the identity of the identified person. For example, a nurse may require a respirator while a surgical mask may be sufficient for a doctor.

In block 510, images of the individual are captured using an IR camera with a $CO_2$ filter. A number of images may be captured, to ensure that sufficient data is available to analyze. In some embodiments, enough images need to be taken within a time limit to clearly see the movement of $CO_2$ in, around or through PPE. The captured images may be a series of images captured by a camera, as indicated in block 502, or sequential frames of a video captured by a camera, as indicated in block 504. The camera may only pass on a subset of images captured, as indicated in block 506. For example, a video captured may have a high enough frame rate such that sequential frames are not needed to capture $CO_2$ flows as a user inhales, exhales, or both. In embodiments where analysis is done remote from the camera, sending only a subset of frames may allow for faster data transmission and analysis. Other image selections, as indicated in block 508, are also expressly contemplated.

In block 520, a unit of PPE is identified and isolated in the captured images. The PPE may be identified by referencing a PPE database for a manufacturer and model of PPE. Because $CO_2$ flow is different between different PPE types, it may be important to identify not only a type of PPE (e.g. FFR or DR), but a particular model number as well.

In block 530, $CO_2$ flow through the PPE is analyzed. The $CO_2$ flow pattern may be characterized based on captured images of a user during a period of inhale, as indicated in block 532. The $CO_2$ flow pattern may be characterized based on captured images of a user during a period of exhale, as indicated in block 534. The $CO_2$ flow pattern may be characterized based on a time period including both an inhale and an exhale, as indicated in block 536. Other time periods are also envisioned, as indicated in block 538. The $CO_2$ flow pattern may provide information about PPE functionality, including whether or not a seal is functional, whether or not a facial covering portion is cracked or leaking, or whether a filter may be experiencing particulate loading.

In block 540, the PPE is evaluated. Evaluating a PPE may include comparing the edges of the PPE to a database of PPE in order to conduct a seal comparison 542 to determine whether a seal is adequately fit to the PPE wearer and leak free. Additionally, evaluating a PPE may include comparing a pressure drop across the PPE, e.g. through a filter, as indicated in block 544. The pressure drop may be visibly detectable by monitoring $CO_2$ flow patterns of a filter-containing PPE against filters with known levels of particulate loading. Other evaluation methods may also be used to evaluate the functionality of a PPE, as indicated in block 546.

Evaluating the PPE device may include checking functionality of one or more components. Once a $CO_2$ flow profile is obtained, it may be compared against $CO_2$ profiles for similar PPE with known-good or known-bad functionality. For example, the PPE device may have a filter and, based on the $CO_2$ flow pattern, an amount of particulate loading may be estimable, as indicated in block 552. Similarly, by comparing the $CO_2$ flow profile against $CO_2$ flow profiles for similar PPE, it may be possible to check the seal, as indicated in block 554. It may also be possible to identify leaks, as indicated in block 556, either in the seal or elsewhere on the PPE. For example, it may be possible to detect cracks or fractures through which gas can escape. Additionally, it may be possible to detect improperly assembled PPE components. For example, a full SCBA respirator may experience leaks if one side is not clicked in correctly. Similarly, it may be possible to analyze fit of the PPE, as indicated in block 558, to determine whether the user is wearing the right size PPE, or needs to go up or down a size. Other analyses may also be done.

In block 550, a recommendation is provided regarding the PPE. The recommendation may be output to a source, such as a display, a communications unit (such as a speaker), or a remote source. In some embodiments, the recommendation indicates where a leak is located. In some embodiments, the recommendation may also include a recommended adjustment, such as repositioning a nose clip. The recommendation may also include other information, such as indicating a consistent lack of fit, determined by a system that has access to historically calculated fit data, or recommend retraining on self-seal checking or a new RPD model or size.

Figure 6:
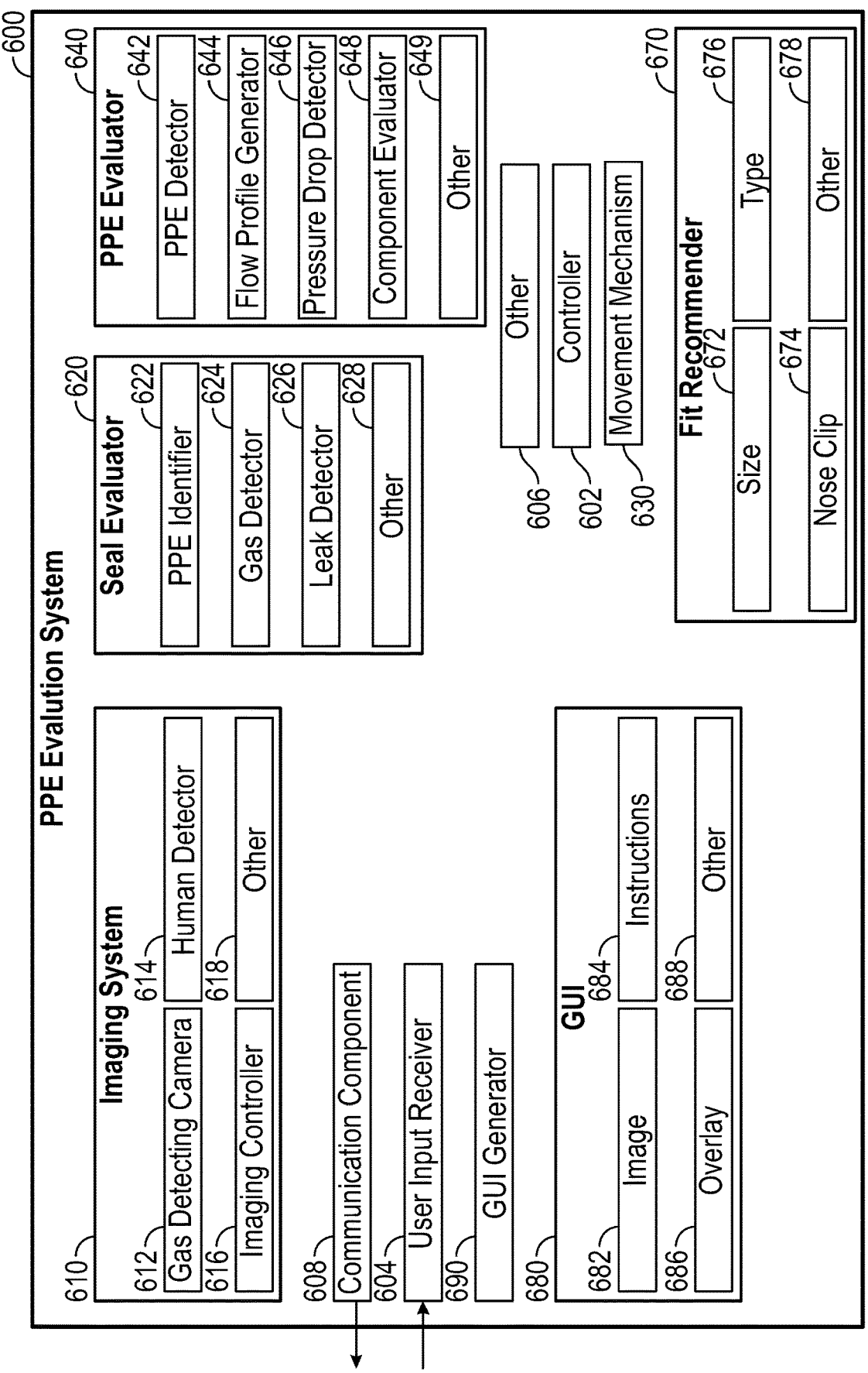
FIG. 6 illustrates a schematic of a PPE evaluation system in accordance with embodiments herein.

FIG. 6 illustrates a schematic of a PPE evaluation system in accordance with embodiments herein. System 600 may be built into an environment, for example with IR camera 612, including a $CO_2$ filter, mounted to a wall, corner or on a mobile unit within the environment. Camera 612 may also be worn, or built into a PPE or other equipment worn by an individual within an environment. System 600 may also be part of a distributed system, for example with some portions located physically within an environment, and other portions accessible over a wireless or cloud-based network.

PPE evaluation system 600 includes an imaging system 610. Imaging system includes a camera system with a gas detecting camera 612. Gas detecting camera 612 may include an IR camera with a $CO_2$ filter, or may be another suitable gas detector. In some embodiments, camera 612 is a camera system, with a light source, pan/tilt system, or movement mechanism. For example, camera 612 may be mounted on a wall, associated with an access point, or mounted on a mobile robot that roams an environment either on a preset or randomized pattern. While a single IR camera 612 is illustrated in FIG. 6, it is expressly contemplated that multiple IR cameras with $CO_2$ filters 612 may be present, or that another camera that captures images outside the IR spectrum is also included. Imaging system 610 may also include a human detector 614. In some embodiments, camera 612 may only capture or record images when a human is detected within a field of view. Such activity may be controlled by imaging controller 616, which may control movement of a robot system, or a pan/tilt system, or may activate or deactivate a light system, for example. Imaging system 610 may have other features 618 as well. It is expressly noted that, while the example of $CO_2$ detection is discussed herein, that other gases may also be detectable using an IR camera. For example, it may be possible to detect harmful gases infiltrating a PPE.

Seal evaluator 620 extracts features from images captured by imaging system 610 in order to output an evaluation of the quality of a PPE seal. Seal evaluator 620 may receive each image captured by imaging system 610, a video stream captured by imaging system 610, or a subset of data captured by imaging system 610. For example, IR camera with $CO_2$ filter 612 may capture images at a high enough rate, or a video camera may have a high frame rate, such that sequential images do not have sufficient contrast for feature detection/extraction. It may be more useful to compare images selected across a timeframe of an individual inhaling and exhaling. It may be desired to reduce a number of images processed by a seal evaluator 620 to a number sufficient for feature extraction while being conscious of data transfer and analysis speed.

Seal evaluator 620 may include PPE identifier 622, which may detect a type, manufacturer, model or size of PPE worn by an individual. PPE identifier 622 may also isolate a detected PPE in the received images such that an area that should be sealed is identified (e.g. by identifying an exterior edge of the identified PPE). PPE identification and isolation may be done, in some embodiments, by communicating with a PPE database (not shown in FIG. 6) and comparing the detected PPE to a database of known PPE. Gas detector 624 may review the received images and detect a flow of gas from and around the PPE. For example, gas detector 624 may determine whether gas is flowing evenly through the center of an RPD, indicating a good seal. Alternatively, gas detector 624 may detect that gas is quickly flowing out through a portion of the perimeter of an RPD, indicating a leak. Leak detector 626 may, based on information from gas detector 624, determine a location and severity of a leak. Depending on regulations, some leakage may be acceptable, or none may be acceptable. Seal evaluator 620 may include other components 628.

PPE evaluation system also includes a PPE evaluator 640 that includes a PPE detector 642 which detects and isolates PPE in the received images. In some embodiments, PPE detector 642 is the same as, or receives information from PPE identifier 622. PPE detector 642 detects a PPE in the images, identifies a type, manufacturer, model or size of the PPE, and isolates the PPE in the images.

A flow profile generator 644 reviews the images and generates a flow profile for the identified PPE. The flow profile may be generated by comparing the detected flow pattern of gas from the PPE with known good or known problem flow profiles. Based on known good or known problematic gas flows, a pressure drop detector 646 may determine whether a pressure drop in the PPE, or PPE components, is indicative of a leak or a particulate loaded filter within the PPE. For example, pressure drop detector 646 may detect one filter changes color, when viewed by the IR camera, more or less than the other. Similarly, a component evaluator 648 may, based on the generated flow profile, determine whether components of the PPE are functioning properly. For example, a faulty valve or improperly connected SCBA filter may experience leakage. It may be possible for component evaluator 648 to detect component failure before in-device sensors are able to. A cracked valve may show intake of $CO_2$ from previous exhalations; while a stuck valve may show no output of $CO_2$ from exhaled breath; and a crack in a seal shows $CO_2$ output. Similarly, loaded filter media may show abnormal or uneven $CO_2$ output—for example, on a respirator that requires two filters, a full, right-hand filter may show no or little $CO_2$ outflow while a left-hand filter is not full and shows excessive $CO_2$ outflow. A crack in a face shield will show $CO_2$ leaking out. Properly functioning closed circuit SCBAs or rebreathers should not show any exhaled gas around the unit, so if any $CO_2$ is seen, then the housing is cracked. Using an SCBA/rebreather, it may also be detectable that a diver is in distress if they are breathing out a lot through their nose instead of using the SCBA system and the $CO_2$ may be visible in those exhalations.

PPE evaluator 640 may have other functionality 649.

Fit recommender 670 may prepare recommendations for improving the fit of a PPE for an individual. In some embodiments, fit recommender 670 is only activated if a leak, functionality problem, or other poor fit indication is obtained. A size recommender 672, for example, may determine whether, based on a generated gas flow profile generator 644, that a PPE size is inappropriate. A new PPE type recommender 676 may determine, based on poor fit, that a different make or model of PPE, for example based on a facial profile of the user, may fit better than a current PPE. Additionally, instructions may be provided on adjusting a nose clip 674 to provide a better fit. Other recommendations 678 may also be provided.

Figure 10:
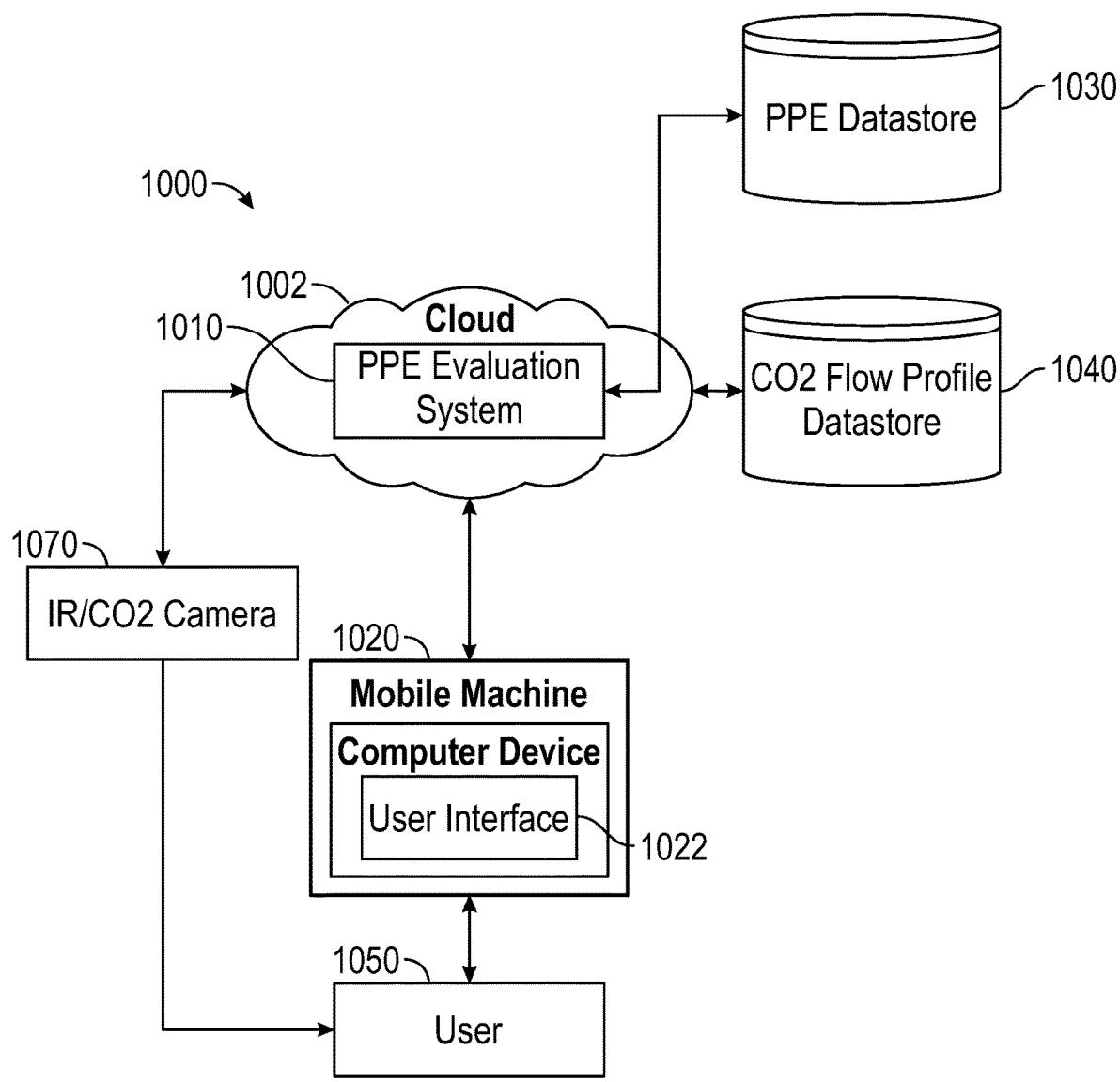
FIG. 10 illustrates a PPE evaluation system architecture.

In some embodiments, for example as described in greater detail in FIG. 10, PPE evaluation system 600 is built into a device with a display component, and a graphical user interface generator 690 that, based on information from seal evaluator 620, PPE evaluator 640, and fit recommender 670, generates a graphical user interface 680. GUI 680 may include an image 682, for example an image taken of an individual by IR camera with $CO_2$ filter 612. GUI 680 may include a quantitative overlay 686, which indicates where a seal is good or poor. Instructions 684 may be presented for improving a fit or functionality of the PPE. GUI 680 may also include other information 688 or images, such as a sequence of images as captured by IR camera with $CO_2$ filter 612.

User input receiver 604 may receive input from a user. In embodiments where PPE evaluation system 600 is built into a device, such as a mobile computer, kiosk, mobile phone, tablet, etc., user input receiver 604 may include a keyboard. In some embodiments, user input receiver 604 includes a microphone that can pick up audio commands from a user.

Communication component 608 may communicate with a source remote from PPE evaluation system 600, for example over a wired, wireless, or cloud-based network. For example, historical data for a given user, or temperature profile information for different PPE types, manufactures, models and different facial profiles may be stored remote from PPE evaluation system 600. Different face profiles in combination with particular PPE models may be more likely to have a particular kind of leak: e.g. someone with a very narrow nose may be more likely to have a particular kind of respirator leak. Systems and methods herein may provide greater knowledge around such correlations. Similarly, information relevant to identifying a particular human, using human detector 614, such as facial recognition information, may also be stored remote from PPE evaluation system 600.

Controller 602 may control activity of components of PPE evaluation system 600, for example activating seal evaluator 620, PPE evaluator 640, fit recommender 670 or communication component 608. Controller 602 may also cause GUI generator 690 to update a GUI 680 based on updated images from camera 612, or based on recommendations from fit recommender 670. Controller 602 may also control a movement mechanism 630, which may move a portion of imaging system 610, or may move a display component displaying GUI 680.

Fit check system may include other components 606 not described in detail with respect to FIG. 6.

In some embodiments, PPE functionality, including seal quality may be improved by knowing information about a user associated with the PPE. For example, having access to a regular breathing pattern for an individual may allow for system 600 to determine that a user is currently breathing shallowly or heavily, which may provide more in-depth fit information. For example, if an individual breathes heavily during a fit test, and passes, it may be more likely that the tested PPE will stay fitted. It may also be possible to connect system 600 to other PPE, such as a microphone associated with a hearing protection device or another device that may capture breathing information for an individual. Alternatively, using a radio-frequency antenna, a breathing pattern may be detected at a distance.

Additionally, using historical information about a user, fit information can be improved. For example, an image taken of a user at a previous date, with a known-good seal, may provide information about how to improve a seal. For example, it may be detected that a nose clip position is in a lower position than the known-good seal, suggesting that the nose clip needs to be repositioned. Similarly, using gas flow profile data captured during a fit test, it may be possible to determine what has changed to cause a leaky seal detected currently.

Using gas detection and flow profile systems powered by IR cameras, as illustrated in FIG. 6, presents some improvement over using IR camera systems alone. While IR cameras can provide indications about temperature changes during exhalation, they are less reliable in some temperature ranges. Additionally, ambient environment conditions, such as ambient temperature and humidity may be needed to provide an accurate temperature profile measurement. In contrast, detecting gases such as $CO_2$, $H_2O$ in an exhalation may be possible in any temperature range. It may still be helpful to have ambient environmental conditions and, in some embodiments, communication component 608 receives ambient environmental information from a remote source, such as a temperature or humidity sensor, or from a weather forecast, etc.

System 600, as discussed herein, may be associated with a stationary or mobile camera within an environment. For example, the camera may be mounted to a wall, or associated with an access point such that a PPE wearer can conduct a functionality or seal test by looking at the camera for a few seconds to inhale and exhale. In other embodiments, system 600 is integrated into other PPE or wearable equipment. For example, a supervisor may wear camera 612 integrated into a helmet, strapped to a shoulder or chest such that images may be captured as the supervisor walks around the environment. GUI 680 may be projected to a heads-up display, on a HOLOLENS™ or other display, such as a mobile phone, computer display or other display within the environment.

Figure 7A:
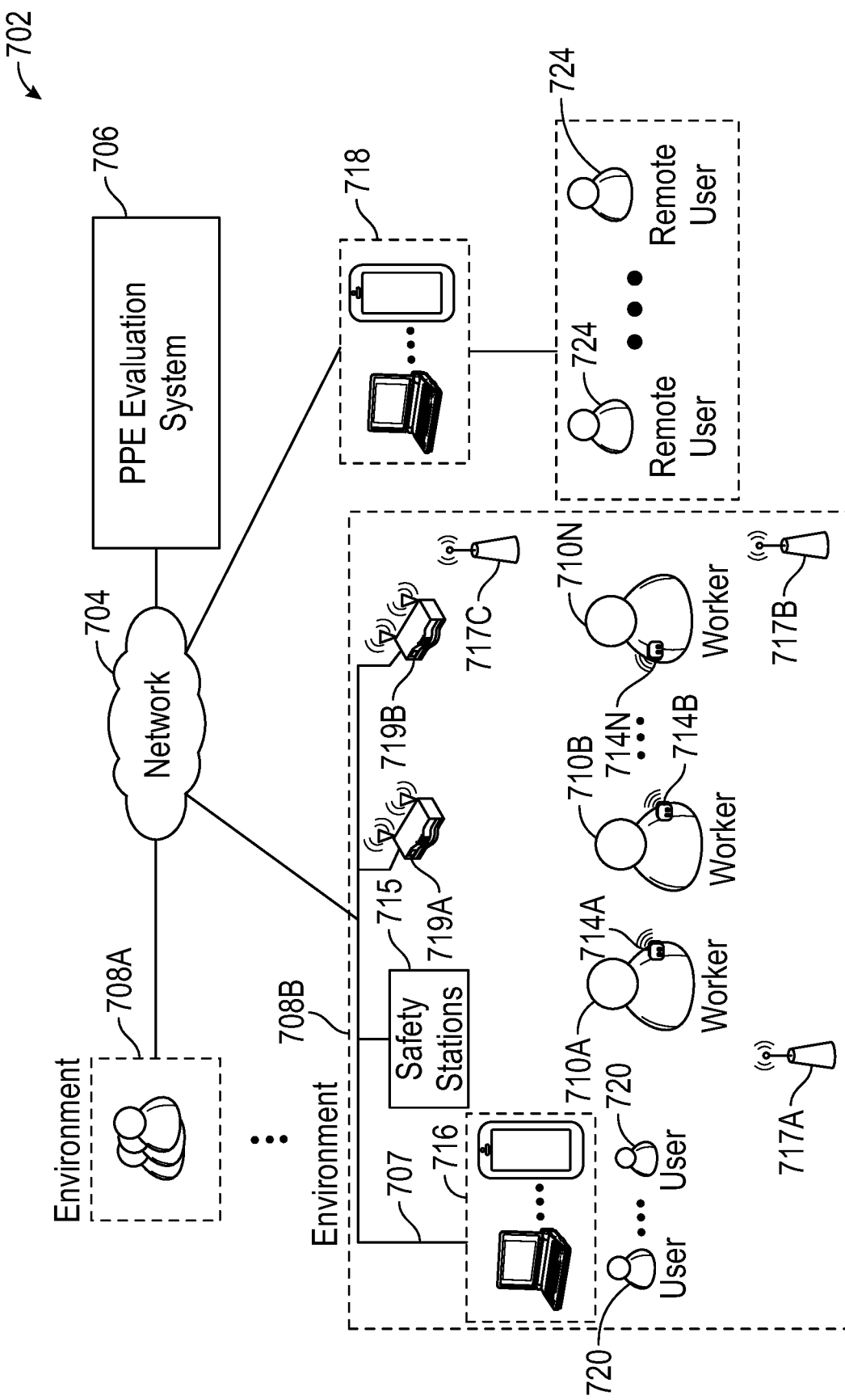
FIGS. 7A-7B illustrate an environment in which embodiments herein may be useful.
Figure 7B:
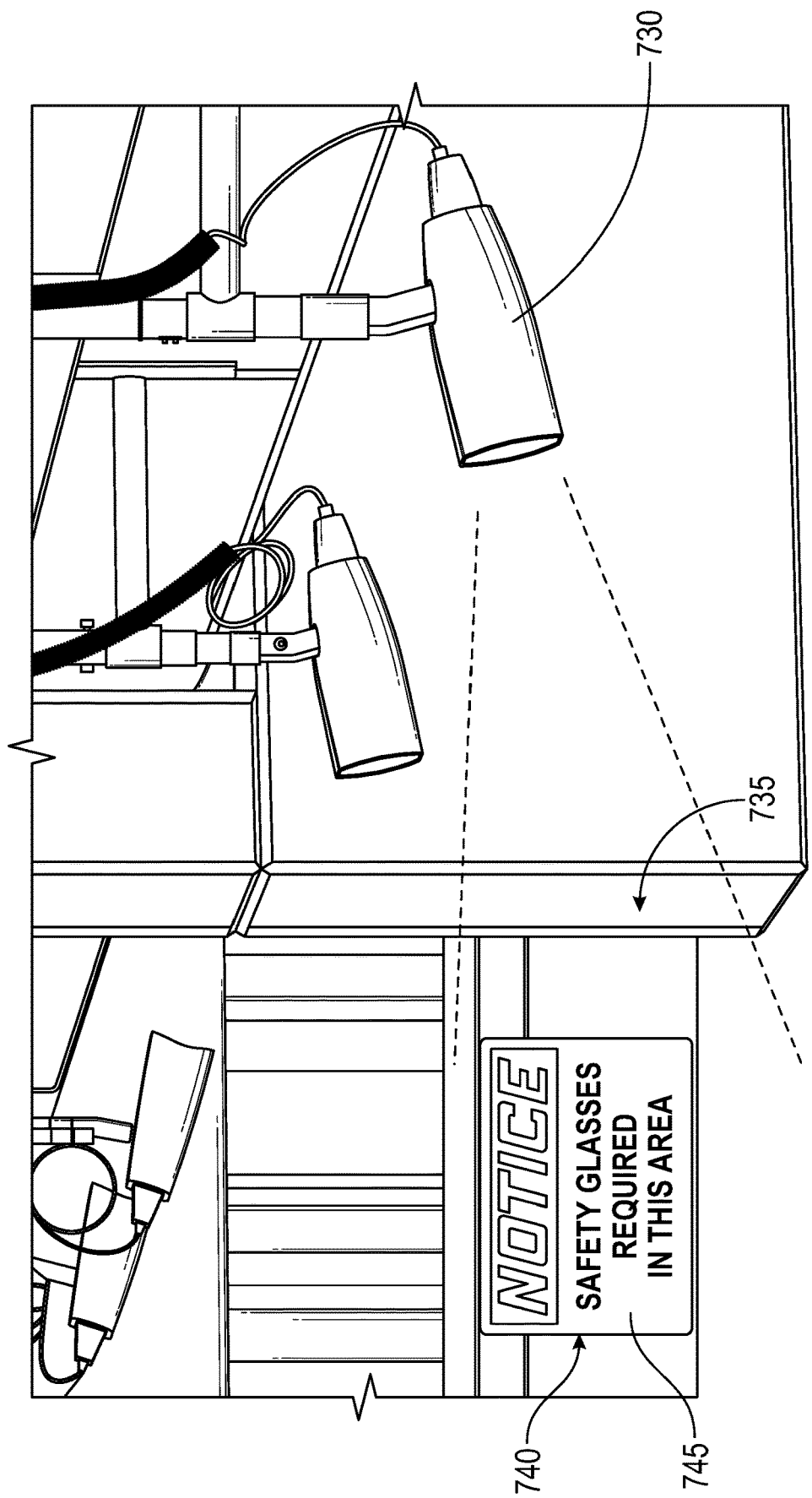

FIGS. 7A-7B illustrate an environment in which embodiments herein may be useful.

An environment 702 may represent any number of environments in which workers may need to wear PPE, such as healthcare settings, industrial settings, or any office setting during a pandemic or flu season. Environment 702 includes a PPE evaluation system 706 for detecting PPE-wearing individuals and checking the fit of their PPE.

PPE evaluation system 706 may reduce incidents of intentional or unintentional PPE misuse by workers in worksite 702. PPE evaluation system 706 may also allow safety professionals to more easily manage health and safety compliance training, and determine which individuals need to change PPE size or models, or who needs retraining on donning PPE correctly.

In general, PPE evaluation system 706, as described in greater detail herein, is configured to identify PPE-wearing individuals within a worksite, conduct seal checks of those individuals and provide seal check results and recommendations to improve fit, when needed. System 706 may be connected, through network 704, to one or more devices or displays 716 within an environment, or devices or displays 718, remote from an environment. System 706 may provide alerts to workers 710A-710N when a seal check comes back as failing, as well as provide feedback on how to improve fit.

System 706 may also be integrated into entry protocols for secured areas within an environment such that workers that do not pass a seal check are restricted out of a secure or dangerous area.

As shown in the example of FIG. 7A, system 702 represents a computing environment in which a computing device within of a plurality of physical environments 708A, 708B (collectively, environments 708) electronically communicate with PPE evaluation system 706 via one or more computer networks 704. Each of physical environments 708A and 708B represents a physical environment, such as a work environment, in which one or more individuals, such as workers 710, utilize respiratory protective devices while engaging in tasks or activities within the respective environment.

In this example, environment 708A is shown as generally as having workers 710, while environment 708B is shown in expanded form to provide a more detailed example. In the example of FIG. 7A, a plurality of workers 710A-710N may be wearing a variety of different PPE.

In some examples, each of environments 708 include computing facilities, such as displays 716, by which workers 710 can communicate with PPE evaluation system 706. For examples, environments 708 may be configured with wireless technology, such as 802.11 wireless networks, 802.15 ZigBee networks, and the like. In the example of FIG. 7A, environment 708B includes a local network 707 that provides a packet-based transport medium for communicating with PPE evaluation system 706 via network 704. In addition, environment 708B may include a plurality of wireless access points 719A, 719B that may be geographically distributed throughout the environment to provide support for wireless communications throughout the work environment.

As shown in the example of FIG. 7A, an environment, such as environment 708B, may also include one or more wireless-enabled beacons, such as beacons 717A-717C, that provide accurate location information within the work environment. For example, beacons 717A-717C may be GPS-enabled such that a controller within the respective beacon may be able to precisely determine the position of the respective beacon. Alternatively, beacons 717A-717C may include a pre-programmed identifier that is associated in PPE evaluation system 706 with a particular location. Based on wireless communications with one or more of beacons 717, or data hub 714 worn by a worker 710, PPE evaluation system 706 is configured to determine the location of the worker within work environment 708B. In this way, event data reported to PPE evaluation system 706 may be stamped with positional information.

In example implementations, an environment, such as environment 708B, may also include one or more safety stations 715 distributed throughout the environment to provide fit testing by accessing fit testing system 706. Safety stations 715 may allow one of workers to conduct a seal check by positioning themselves in front of a camera and following instructions provided either audibly, visually or otherwise by safety station 715.

In addition, each of environments 708 include computing facilities that provide an operating environment for end-user computing devices 716 for interacting with PPE evaluation system 706 via network 704. For example, each of environments 708 typically includes one or more safety managers or supervisors, represented by users 720 or remote users 724, are responsible for overseeing safety compliance within the environment. In general, each user 720 or 724 interacts with computing devices 716, 718 to access PPE evaluation system 706. For example, the end-user computing devices 716, 718 may be laptops, desktop computers, mobile devices such as tablets or so-called smart cellular phones.

PPE evaluation system 706 may be configured to actively monitor workers 710A-710N and other users 720 within an environment 708 both for correct usage of RPDs. Referring to FIG. 7B, a worksite may have one or more cameras 730, either fixed within the worksite, mobile (e.g. drone, robot or equipment-mounted) or associated with a worker 710A-710N (e.g. an augmented reality headset or other camera worn in association with PPE, etc.). Using the one or more cameras, PPE evaluation system 706 may be able to automatically identify whether or not a worker 710A-710N passes or fails a seal check, without the worker 710A-710N being interrupted during a task.

As another example, PPE evaluation system 706 may further trigger an alert if a seal check or PPE evaluation is failed, either once or repeatedly by a given worker. The alert may be sent to worker 710, either through a communication feature of a PPE, a separate communication device, or through a public address system within the environment. A failed seal check alert may also be sent to a supervisor or safety officer associated with the environment 708 as well. Seal check or PPE evaluation results items may also be tracked and stored within a database, as described herein.

FIGS. 8A-8E illustrates PPE that may be evaluated using systems and methods herein. FIG. 8A illustrates a half-mask 810 that covers the nose and mouth of the user with straps that extend around a user's head to hold the mask in place. FIG. 8B illustrates a full-face mask 820. FIG. 8C illustrates a helmet 830. FIG. 8D illustrates a face shield 840. FIG. 8E illustrates a hood 850. Other suitable face-covering PPE may also benefit from systems and methods herein.

Figure 9:
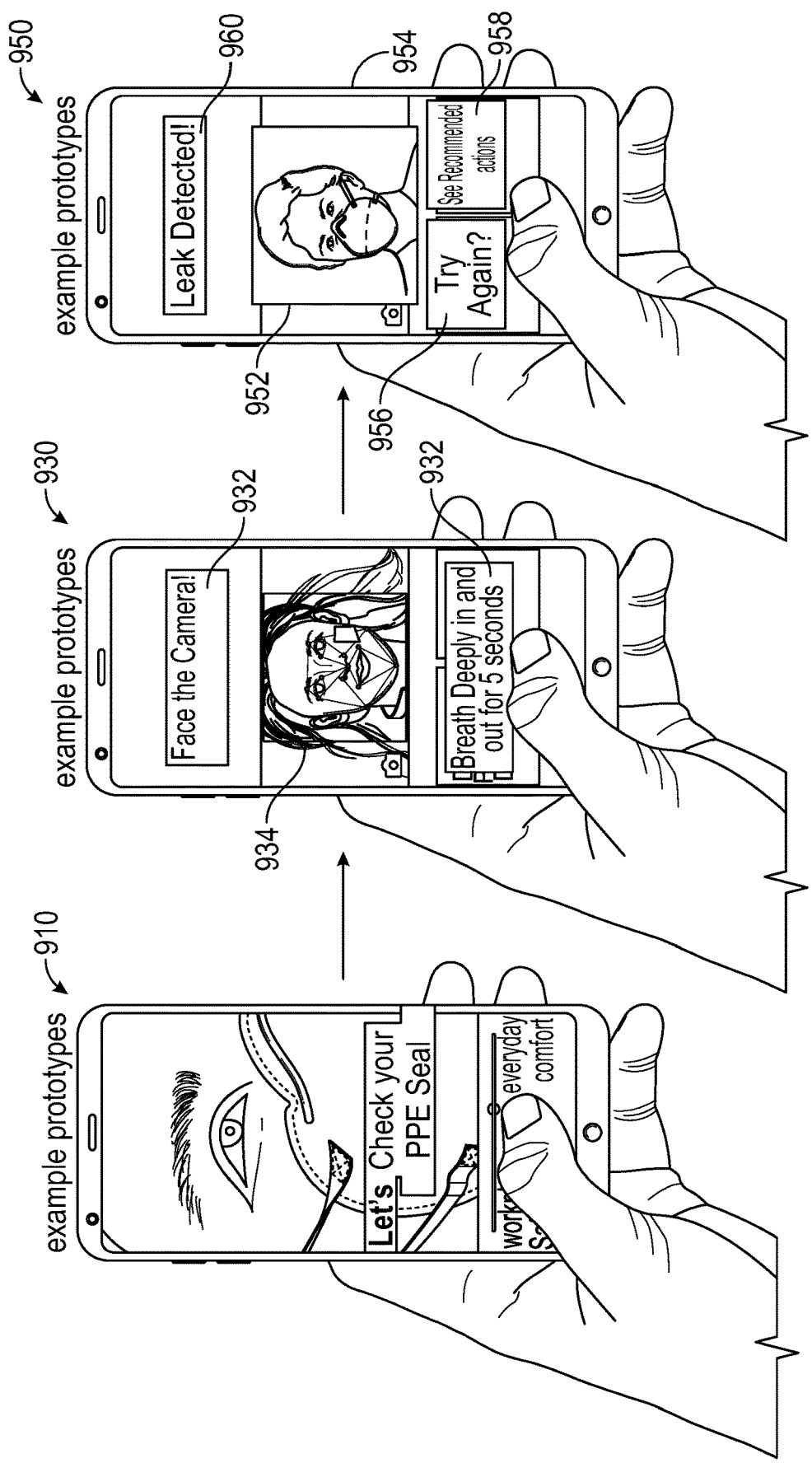
FIG. 9 illustrates a mobile application for form fitting a respiratory protection device to a wearer in accordance with embodiments herein.

FIG. 9 illustrates a mobile application for checking functionality of a PPE in accordance with embodiments herein. FIG. 9 illustrates a progression of example graphical user interfaces 910, 930, 950 that a user may encounter while conducting a seal, or other functionality check for their RPD. An application such as that illustrated in FIG. 9 may be intended for general public use, for example for individuals wanting to wear PPE to limit spread of an illness or to prevent themselves from getting sick. However, the graphical user interfaces represented in FIG. 9 may also be presented on a display associated with a kiosk or otherwise associated with a work environment, such as environment 702.

Graphical user interface 910 illustrates an opening screen of an application that a user has opened.

Graphical user interface 930 illustrates a user receiving instructions for capturing $CO_2$ flow profile information, for example using an IR/$CO_2$ filter system to capture image data of the user wearing an RPD. Instructions 932 are presented as both above and below an image 934. Image 934 may be a stock photo showing how the user should view the screen (e.g. facing forward), or may be a live view of what an IR camera attachment to a mobile computing device (or built into the mobile computing device) is currently recording.

Graphical user interface 950 illustrates results presented to the user after a PPE check has been conducted. A leak detection indication 960 may be presented. An overlay 952 may presented over a user view 954 indicating where the detected leak is located. An option to retry the PPE check 956 may be presented. For example, a user may want to retake the test after seeing and implementing recommendations 958.

The PPE evaluation results and recommendations may be generated locally, using a CPU of the mobile computing device, in one embodiment. In another embodiment, the images captured of the user are wirelessly transferred to a remote server that generates a temperature profile and detects leaks by comparing the generated temperature profile to a database of profiles indicative of different leak locations.

FIG. 10 is a block diagram of a PPE evaluation system architecture. The remote server architecture 1000 illustrates one embodiment of an implementation of PPE evaluation system 1010. As an example, remote server architecture 1000 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown or described in FIGS. 1-9 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided by a conventional server, installed on client devices directly, or in other ways.

In the example shown in FIG. 10, some items are similar to those shown in earlier figures. FIG. 10 specifically shows that a PPE evaluation system 1010 can be located at a remote server location 1002. Therefore, computing device 1020 accesses those systems through remote server location 1002. User 1050 can use computing device 1020 to access user interfaces 1022 as well. For example, a user 1050 may be a user wanting to check a fit of their respiratory protection device while sitting in a parking lot, and interacting with an application on the user interface 1022 of their smartphone 1020, or laptop 1020, or other computing device 1020.

FIG. 10 shows that it is also contemplated that some elements of systems described herein are disposed at remote server location 1002 while others are not. By way of example, storage 1030 or 1040 or a camera 1070 can be disposed at a location separate from location 1002 and accessed through the remote server at location 1002. Regardless of where they are located, they can be accessed directly by computing device 1020, through a network (either a wide area network or a local area network), hosted at a remote site by a service, provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. This may allow a user 1050 to interact with system 1010 through their computing device 1020, to initiate a seal check process.

It will also be noted that the elements of systems described herein, or portions of them, can be disposed on a wide variety of different devices. Some of those devices include servers, desktop computers, laptop computers, imbedded computer, industrial controllers, tablet computers, or other mobile devices, such as palm top computers, cell phones, smart phones, multimedia players, personal digital assistants, etc.

Figure 11:
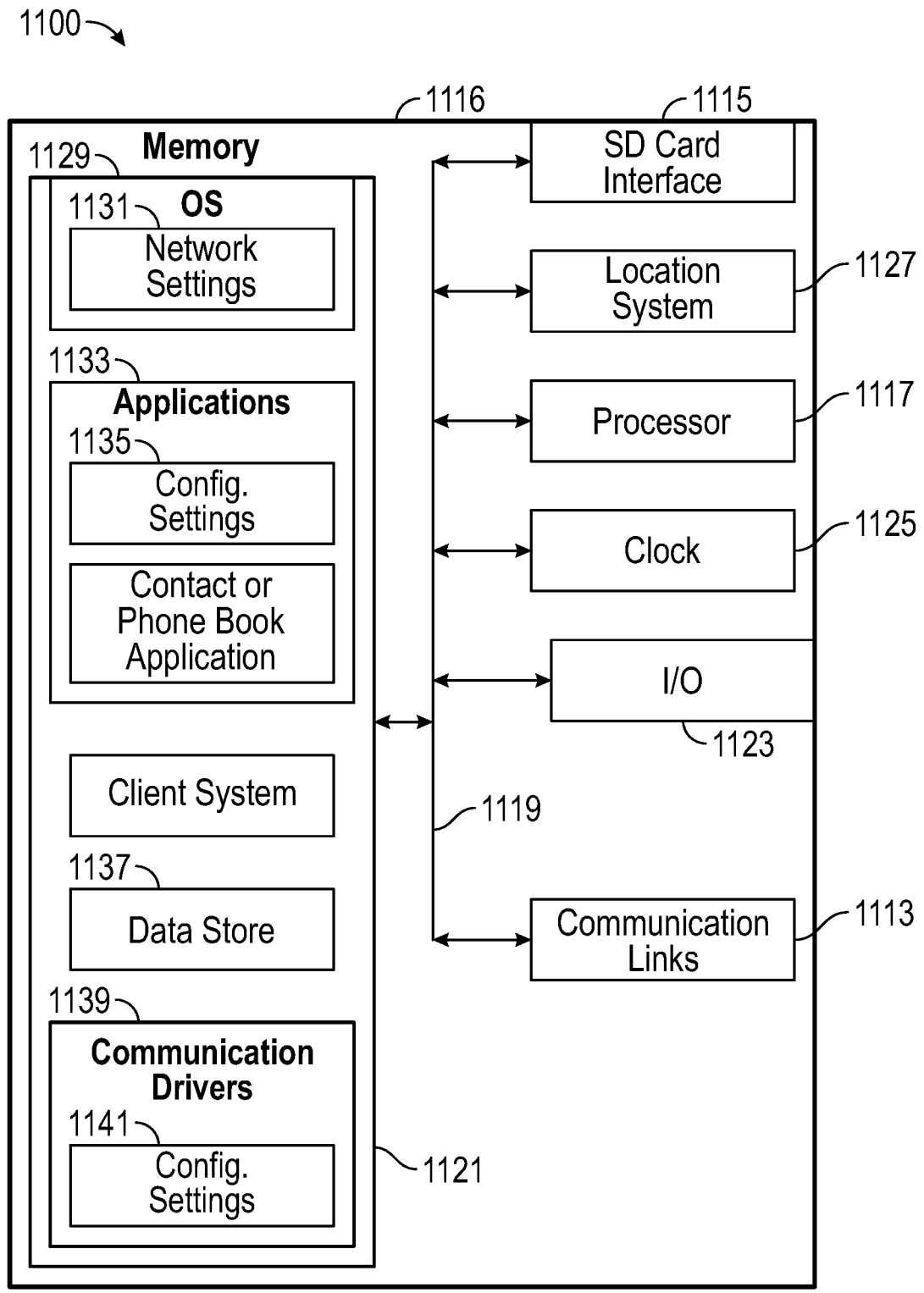
FIGS. 11-13 illustrate example devices that can be used in embodiments herein.
Figure 12:
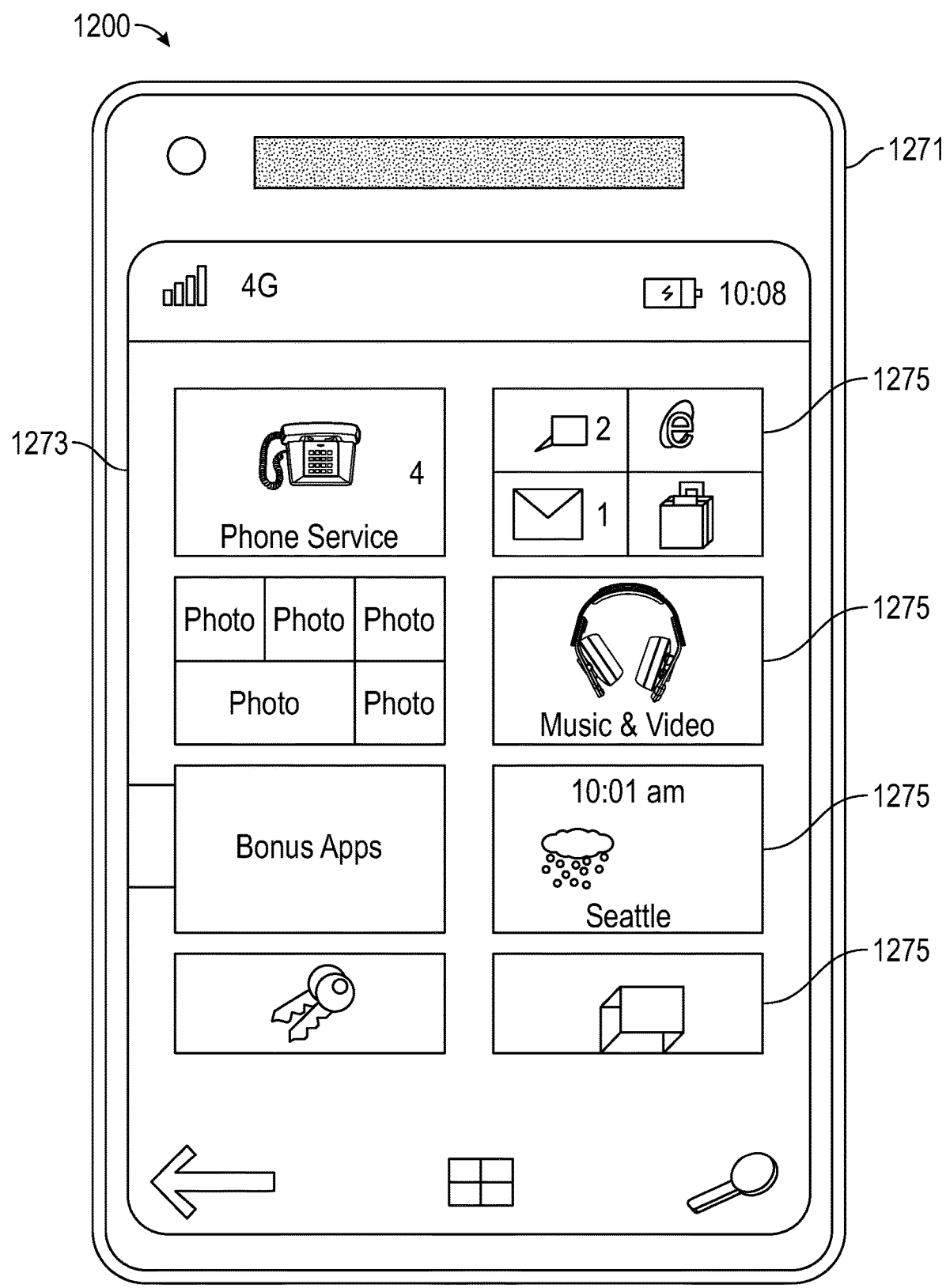
Figure 13:
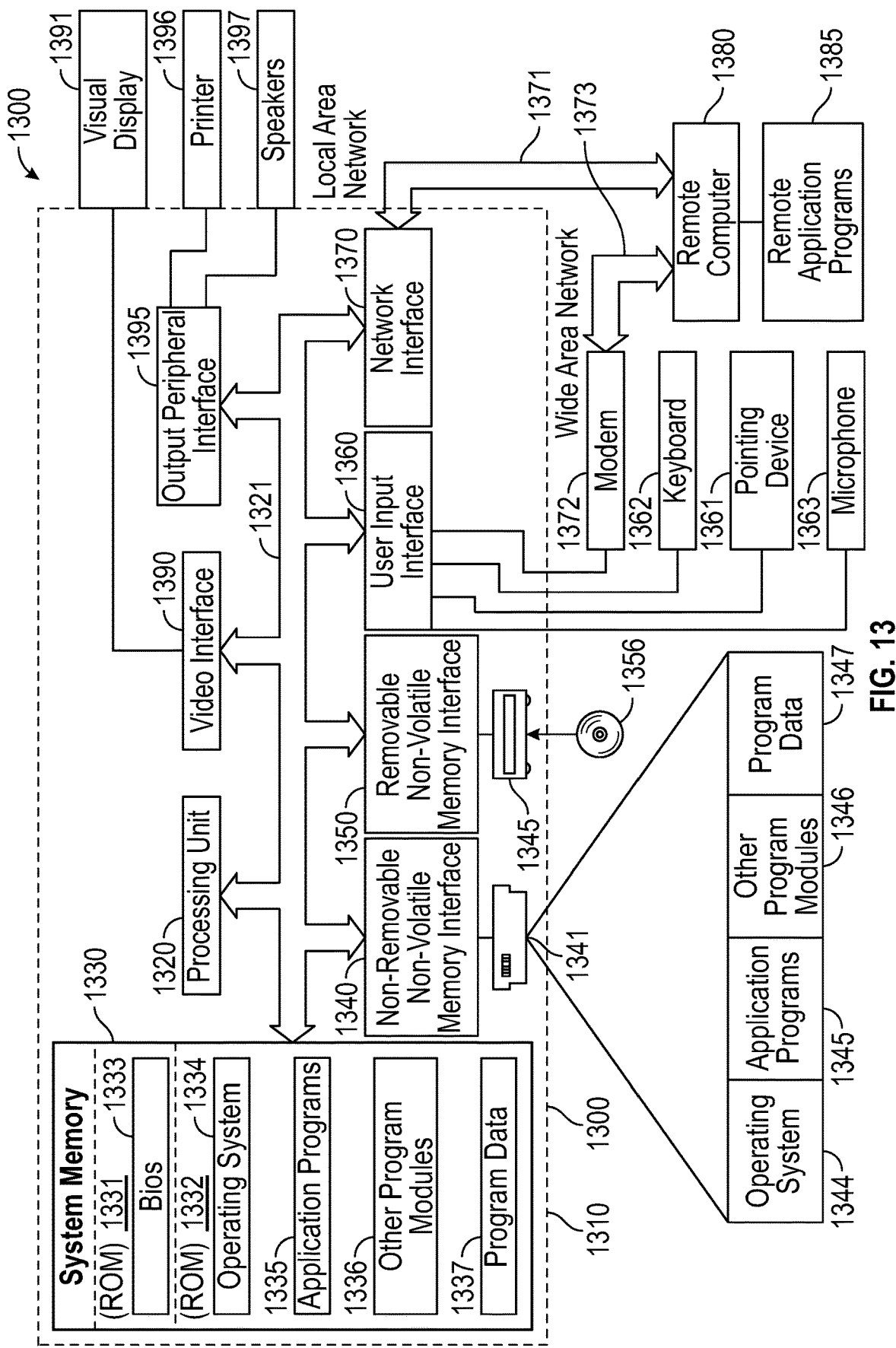

FIGS. 11-13 illustrate example devices that can be used in the embodiments shown in previous Figures. FIG. 11 illustrates an example mobile device that can be used in the embodiments shown in previous Figures. FIG. 11 is a simplified block diagram of one illustrative example of a handheld or mobile computing device that can be used as either a user's device or a supervisor/safety officer device, for example, in which the present system (or parts of it) can be deployed. For instance, a mobile device can be deployed in the operator compartment of computing device for use in generating, processing, or displaying the data.

FIG. 11 provides a general block diagram of the components of a mobile cellular device 1116 that can run some components shown and described herein. Mobile cellular device 1116 interacts with them or runs some and interacts with some. In the device 1116, a communications link 1113 is provided that allows the handheld device to communicate with other computing devices and under some embodiments provides a channel for receiving information automatically, such as by scanning. Examples of communications link 1113 include allowing communication though one or more communication protocols, such as wireless services used to provide cellular access to a network, as well as protocols that provide local wireless connections to networks.

In other examples, applications can be received on a removable Secure Digital (SD) card that is connected to an interface 1115. Interface 1115 and communication links 1113 communicate with a processor 1117 (which can also embody a processor) along a bus 1119 that is also connected to memory 1121 and input/output (I/O) components 1123, as well as clock 1125 and location system 1127.

I/O components 1123, in one embodiment, are provided to facilitate input and output operations and the device 1116 can include input components such as buttons, touch sensors, optical sensors, microphones, touch screens, proximity sensors, accelerometers, orientation sensors and output components such as a display device, a speaker, and or a printer port. Other I/O components 1123 can be used as well.

Clock 1125 illustratively comprises a real time clock component that outputs a time and date. It can also provide timing functions for processor 1117.

Illustratively, location system 1127 includes a component that outputs a current geographical location of device 1116. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 1121 stores operating system 1129, network settings 1131, applications 1133, application configuration settings 1135, data store 1137, communication drivers 1139, and communication configuration settings 1141. Memory 1121 can include all types of tangible volatile and non-volatile computer-readable memory devices. It can also include computer storage media (described below). Memory 1121 stores computer readable instructions that, when executed by processor 1117, cause the processor to perform computer-implemented steps or functions according to the instructions. Processor 1117 can be activated by other components to facilitate their functionality as well. It is expressly contemplated that, while a physical memory store 1121 is illustrated as part of a device, that cloud computing options, where some data and/or processing is done using a remote service, are available.

FIG. 12 shows that the device can also be a smart phone 1271. Smart phone 1271 has a touch sensitive display 1273 that displays icons or tiles or other user input mechanisms 1275. Mechanisms 1275 can be used by a user to run applications, make calls, perform data transfer operations, etc. In general, smart phone 1271 is built on a mobile operating system and offers more advanced computing capability and connectivity than a feature phone. Note that other forms of the devices are possible.

FIG. 13 is one example of a computing environment in which elements of systems and methods described herein, or parts of them (for example), can be deployed. With reference to FIG. 13, an example system for implementing some embodiments includes a general-purpose computing device in the form of a computer 1310. Components of computer 1310 may include, but are not limited to, a processing unit 1320 (which can comprise a processor), a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. Memory and programs described with respect to systems and methods described herein can be deployed in corresponding portions of FIG. 13.

Computer 1310 typically includes a variety of computer readable media. Computer readable media can be any available media that can be accessed by computer 1310 and includes both volatile/nonvolatile media and removable/non-removable media. By way of example, and not limitation, computer readable media may comprise computer storage media and communication media. Computer storage media is different from, and does not include, a modulated data signal or carrier wave. It includes hardware storage media including both volatile/nonvolatile and removable/non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1310. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1330 includes computer storage media in the form of volatile and/or nonvolatile memory such as read only memory (ROM) 1331 and random-access memory (RAM) 1332. A basic input/output system 1333 (BIOS) containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1434, application programs 1335, other program modules 1336, and program data 1337.

The computer 1310 may also include other removable/non-removable and volatile/nonvolatile computer storage media. By way of example only, FIG. 13 illustrates a hard disk drive 1341 that reads from or writes to non-removable, nonvolatile magnetic media, nonvolatile magnetic disk 1352, an optical disk drive 1355, and nonvolatile optical disk 1356. The hard disk drive 1341 is typically connected to the system bus 1321 through a non-removable memory interface such as interface 1340, and optical disk drive 1355 are typically connected to the system bus 1321 by a removable memory interface, such as interface 1350.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 1310. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337.

A user may enter commands and information into the computer 1310 through input devices such as a keyboard 1362, a microphone 1363, and a pointing device 1361, such as a mouse, trackball or touch pad. Other input devices (not shown) may include a joystick, game pad, satellite receiver, scanner, a gesture recognition device, or the like. These and other input devices are often connected to the processing unit 1320 through a user input interface 1360 that is coupled to the system bus but may be connected by other interface and bus structures. A visual display 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 is operated in a networked environment using logical connections, such as a Local Area Network (LAN) or Wide Area Network (WAN) to one or more remote computers, such as a remote computer 1380. The computer may also connect to the network through another wired connection. A wireless network, such as WiFi may also be used.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. In a networked environment, program modules may be stored in a remote memory storage device. FIG. 13 illustrates, for example, that remote application programs 1385 can reside on remote computer 1380.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Here, the exemplary embodiments of the present invention have been described in detail, but it should be understood that the present invention is not limited to the specific embodiments described and illustrated in detail above. Those skilled in the art can make various variations and variants of the present invention without departing from the gist and scope of the present invention. All these variations and variants fall within the scope of the present invention. Moreover, all components described here can be replaced by other technically equivalent components.

A system for a PPE device is disclosed that includes an infrared camera that captures an image sequence of a user wearing the PPE device. The system also includes a gas profile generator that analyzes the image sequence and generates a gas profile of the PPE device. The system also includes an analyzer that determines a status of the PPE device based on the gas profile. The system also includes a communication component that communicates the status.

The system may be implemented such that the gas is carbon dioxide. The infrared camera includes a carbon dioxide filter.

The system may be implemented such that the gas is water vapor.

The system may be implemented such that the analyzer is a leak detector. The PPE status includes a seal quality.

The system may be implemented such that the leak detector further provides a leak location indication.

The system may be implemented such that the analyzer is a valve analyzer. The PPE status is a faulty valve.

The system may be implemented such that the analyzer is a filter loading detector. The PPE status is a loaded filter detected.

The system may be implemented such that the gas profile generator generates the gas profile based on a set of images of an exhale of a wearer of the PPE.

The system may be implemented such that the plurality of images are from a video capturing the exhale.

The system may be implemented such that an image identifier identifies the set of images as indicative of the exhale.

The system may be implemented such that the communication component communicates the PPE status to a display.

The system may be implemented such that the communication component communicates the infrared images to the display.

The system may be implemented such that the IR camera automatically captures the image sequence upon detecting the user in a field of view of the camera.

The system may be implemented such that the camera is part of a stationary system.

The system may be implemented such that the camera is part of a mobile system.

The system may be implemented such that the system is a mobile computing system.

The system may be implemented such that the IR camera is built into the mobile computing system.

The system may be implemented such that the IR camera includes a portable IR lens with $CO_2$ filter that couples to the mobile computing system.

The system may be implemented such that the communication component includes a graphical user interface generator that generates a graphical user interface for a display of the mobile computing system.

The system may be implemented such that the mobile computing system is a mobile phone.

The system may be implemented such that the mobile computing system is a tablet.

The system may be implemented such that the image capture is triggered by a touch-free command.

The system may be implemented such that the touch-free command is an audio command from the user.

The system may be implemented such that the communication component communicates an alert if the functional status is unsatisfactory.

The system may be implemented such that the alert includes instructions for increasing a functionality of the PPE.

The system may be implemented such that the communication component communicates the fit status to a graphical user interface generator. The graphical user interface generator generates a graphical user interface that displays a fit indication.

The system may be implemented such that the PPE is a respiratory protection device.

The system may be implemented such that the PPE is a supplied air respirator or a self-contained breathing apparatus (SCBA).

The system may be implemented such that the PPE is a helmet.

The system may be implemented such that the PPE is a face shield.

A method for checking a personal protective equipment (PPE) device is presented. The method includes capturing an infrared image, using an IR camera, of a wearer of the PPE device. The method also includes generating a gas flow profile of a gas, based on the IR image, for the PPE device, from the captured image. The method also includes identifying a status of the PPE device based on the gas flow profile. The method also includes communicating the PPE status, using a communication component.

The method may be implemented such that the gas is carbon dioxide and the IR camera has a carbon dioxide filter.

The method may be implemented such that the gas is water vapor.

The method may be implemented such that the infrared image captures the wearer exhaling.

The method may be implemented such that the infrared image captures the wearer inhaling.

The method may be implemented such that the infrared image is from a video captured by the IR camera.

The method may be implemented such that the PPE status is a leak within a seal of the PPE.

The method may be implemented such that the gas flow profile includes gas flowing through a perimeter of the PPE, indicative of the leak.

The method may be implemented such that communicating the PPE status includes providing an alert of the detected leak.

The method may be implemented such that the alert is communicated to a display.

The method may be implemented such that the alert is communicated to an access point. Access is denied based on the detected leak.

The method may be implemented such that the PPE status is a leaky connection between a first PPE component and a second PPE component.

The method may be implemented such that communicating the PPE status includes communicating the leaky connection.

The method may be implemented such that communicating further includes providing instructions for fixing the leaky connection.

The method may be implemented such that the PPE status is a loaded filter.

The method may be implemented such that communicating the PPE status includes communicating the loaded filter.

The method may be implemented such that capturing the image is done automatically when the wearer is detected in a field of view of the camera.

The method may be implemented such that capturing the image is done automatically when a wearer exhalation is detected.

The method may be implemented such that capturing the image is done automatically when a wearer inhalation is detected.

The method may be implemented such that the leak location is communicated to a graphical user interface generator which provides an indication of the leak location on a graphical user interface.

The method may be implemented such that the leak location is overlayed over the image.

The method may be implemented such that it also includes the wearer activating an application on a computing device and, based on the activation, automatically completing the steps of capturing, generating and identifying.

The method may be implemented such that the computing device includes the camera.

The method may be implemented such that the camera is separate from the computing device.

The method may be implemented such that identifying the functional defect includes: identifying a type of the PPE, comparing the gas flow profile to a database of gas flow profiles associated with the type of PPE, and determining, based on the comparison, that the PPE has the functional defect.

The method may be implemented such that the PPE is a respiratory protection device.

The method may be implemented such that the PPE is a supplied air respirator or a self-contained breathing apparatus (SCBA).

The method may be implemented such that the PPE is a helmet.

The method may be implemented such that the PPE is a face shield.

A touch free safety monitoring system is presented that includes an IR camera with a field of view configured to, when an individual is detected within the field of view, capture a sequence of IR images of the individual. The system also includes a gas flow profile generator that, based on the images, generates a gas flow profile of a gas flow from a PPE worn by the individual. The system also includes a PPE evaluator that, based on the gas flow profile, evaluates a PPE function. The system also includes a communication module that communicates the PPE function, using a communication component.

The system may be implemented such that the PPE function is a seal quality of a seal between the PPE and a face of the individual.

The system may be implemented such that the PPE function is a valve function of the PPE.

The system may be implemented such that the PPE function is a loading level of a filter of the PPE.

The system may be implemented such that the gas is carbon dioxide. The IR camera includes a carbon dioxide filter.

The system may be implemented such that the gas is water vapor.

The system may be implemented such that the sequence of IR images are a video captured by the IR camera.

The system may be implemented such that the PPE evaluator compares the generated gas flow profile to a database of gas flow profiles.

The system may be implemented such that it includes a PPE identifier that identifies a type, manufacturer, or model of the PPE. The database of gas flow profiles includes gas flow profiles of the identified type, manufacturer or model.

The system may be implemented such that it also includes an ambient temperature receiver that receives an ambient temperature indication for an area including the field of view. The database of gas flow profiles includes gas flow profiles captured at a similar ambient temperature.

The system may be implemented such that the system is mounted to a mobile station configured to move about an environment.

The system may be implemented such that the mobile station automatically moves about the environment according to a movement pattern.

The system may be implemented such that the mobile station includes a second individual.

The system may be implemented such that the system is incorporated into a device including the IR camera.

The system may be implemented such that the IR camera is a stationary camera within an environment.

The system may be implemented such that the communication module communicates the seal quality to an access point. Access is granted if the PPE function is acceptable.

The system may be implemented such that the communication module provides the PPE function indication to a log for the individual.

The system may be implemented such that, if the seal quality indicates a leak, the communication module communicates a leak indication.

The system may be implemented such that the leak indication is provided visually, through a display.

The system may be implemented such that the leak indication is provided as an overlay over one of the captured IR images.

The system may be implemented such that the leak indication includes a leak location indication.

The system may be implemented such that the PPE is a respiratory protection device.

The system may be implemented such that the PPE is a supplied air respirator or a self-contained breathing apparatus (SCBA).

The system may be implemented such that the PPE is a helmet.

The system may be implemented such that the PPE is a face shield.

What is claimed is:

1. A system for a PPE device, the system comprising:
   a camera that captures an image sequence of a user wearing the PPE device;
   a gas profile generator that analyzes the image sequence and generates a gas profile of the PPE device;
   an analyzer that determines a status of the PPE device based on the gas profile; and
   a communication component that communicates the status; wherein the gas comprises carbon dioxide, and wherein the camera is an infrared camera that comprises a carbon dioxide filter.

2. The system of claim 1, wherein the gas comprises water vapor.

3. The system of claim 1, wherein the analyzer is a leak detector, and wherein the PPE status comprises a seal quality indication.

4. The system of claim 3, wherein the leak detector further provides a leak location indication.

5. The system of claim 1, wherein the gas profile generator generates the gas profile based on a set of images of an exhale of a wearer of the PPE.

6. The system of claim 1, wherein the communication component communicates the fit status to a graphical user interface generator, and wherein the graphical user interface generator generates a graphical user interface that displays a fit indication.

7. A method for checking a personal protective equipment (PPE) device, the method comprising:
   capturing an image, using a camera, of a wearer of the PPE device;
   generating a gas flow profile of a gas, based on the image, for the PPE device, based om the captured image;
   based on the generated gas flow profile, identifying a status of the PPE device; and
   communicating the PPE status, using a communication component;
   wherein the gas comprises carbon dioxide, the camera is an infrared (IR) camera, and wherein the IR camera has a carbon dioxide filter.

8. The method of claim 7, wherein the image comprises the wearer exhaling.

9. The method of claim 7, wherein the gas flow profile comprises gas flowing through a perimeter of the PPE, indicative of a leak within a seal of the PPE.

10. The method of claim 7, wherein capturing the image is done automatically when the wearer is detected in a field of view of the camera.

11. The method of claim 10, wherein capturing the image is done automatically when a wearer exhalation is detected.

12. The method of claim 7, and further comprising the wearer activating an application on a computing device and, based on the activation, automatically completing the steps of capturing, generating and identifying.

13. The method of claim 7, wherein identifying the functional defect comprises:
   identifying a type of the PPE;
   comparing the gas flow profile to a database of gas flow profiles associated with the type of PPE; and
   determining, based on the comparison, that the PPE has the functional defect.

14. A touch free safety monitoring system comprising:
   a camera with a field of view configured to, when an individual is detected within the field of view, capture a sequence of images of the individual;
   a gas flow profile generator that, based on the images, generates a gas flow profile of a gas flow from a PPE worn by the individual;
   a PPE evaluator that, based on the gas flow profile, evaluates a PPE function; and
   a communication module that communicates the PPE function, using a communication component;
   wherein a gas associated with the gas flow comprises carbon dioxide, the camera is an infrared (IR) camera, and wherein the IR camera has a carbon dioxide filter.

15. The system of claim 14, wherein the PPE function is a seal quality of a seal between the PPE and a face of the individual, a valve function of the PPE or a loading level of a filter of the PPE.

16. The system of claim 14, wherein the PPE evaluator compares the generated gas flow profile to a database of gas flow profiles.

17. The system of claim 16, and further comprising an ambient temperature receiver that receives an ambient temperature indication for an area including the field of view, and wherein the database of gas flow profiles comprise gas flow profiles captured at a similar ambient temperature.

18. The system of claim 14, wherein the PPE is a respiratory protection device, a supplied air respirator or a self-contained breathing apparatus (SCBA), a helmet, or a face shield.

* * * * *